US007716271B1

(12) United States Patent
Bertsekas et al.

(10) Patent No.: US 7,716,271 B1
(45) Date of Patent: May 11, 2010

(54) ROUTING AND WAVELENGTH ASSIGNMENT IN OPTICAL NETWORKS

(75) Inventors: Dimitri P. Bertsekas, Belmont, MA (US); Asuman E. Koksal, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 2478 days.

(21) Appl. No.: 10/157,375

(22) Filed: May 29, 2002

Related U.S. Application Data

(60) Provisional application No. 60/295,941, filed on Jun. 5, 2001.

(51) Int. Cl.
*G06F 15/16* (2006.01)
(52) U.S. Cl. .......................... 709/200; 709/223; 398/45; 370/235
(58) Field of Classification Search .................. 709/200, 709/223; 398/45
See application file for complete search history.

(56) References Cited

U.S. PATENT DOCUMENTS

| 5,351,146 | A |   | 9/1994 | Chan et al. |       |
|-----------|---|---|--------|-------------|-------|
| 5,729,466 | A | * | 3/1998 | Bamji ........................... | 716/10 |
| 5,764,858 | A | * | 6/1998 | Sheu et al. ..................... | 706/26 |
| 6,075,631 | A | * | 6/2000 | Bala et al. ....................... | 398/1 |
| 6,529,300 | B1 | * | 3/2003 | Milton et al. .................. | 398/59 |
| 6,728,484 | B1 | * | 4/2004 | Ghani ........................... | 398/42 |
| 6,748,170 | B1 | * | 6/2004 | Clinkler ....................... | 398/47 |
| 6,999,682 | B2 | * | 2/2006 | Dasylva et al. ................. | 398/79 |
| 7,092,633 | B2 | * | 8/2006 | Fumagalli et al. ............. | 398/59 |
| 7,388,872 | B2 | * | 6/2008 | Montgomery, Jr. .......... | 370/404 |
| 2004/0085899 | A1 | * | 5/2004 | Magill et al. ................. | 370/230 |
| 2005/0132062 | A1 | * | 6/2005 | Halme ......................... | 709/227 |

OTHER PUBLICATIONS

Narenda K. Singhal, Biswanath Mukherjee, "Architectures and Algorithm for Multicasting in WDM Optical Mesh Networks using Opaque and Transparent Optical Cross-Connects", Dept. of CS, University of California, Davis, CA 95616, pp. 1-3, 2001.*

(Continued)

*Primary Examiner*—John Follansbee
*Assistant Examiner*—Anthony Mejia
(74) *Attorney, Agent, or Firm*—Occhiuti Rohlicek & Tsao LLP

(57) ABSTRACT

A method for solving routing and wavelength assignment (RWA) problems for all-optical networks involves formulating a joint optimization problem in which the routing of lightpaths and assignment of wavelengths on links of those routes to the lightpaths is expressed jointly in terms of a single optimization criterion. The method features formulation of the joint optimization problem as a continuous variable optimization problem with a convex constraint set. Integer constraints, for example, related to the fact that any particular lightpath is not permitted to split over multiple routes or over separate wavelengths on a link of its route, are not necessarily represented explicitly by the constraint set. However, the formulation of the objective function is such that although the problem is formulated in terms of continuous optimization variables, optimal solutions to the problem are integer or equivalent to an integer solution, thereby satisfying the integer constraints.

20 Claims, 11 Drawing Sheets

OTHER PUBLICATIONS

Tibor Fabry-Asztalos, Nilesh Bhide, and Krishna M. Sivalingam, "Adaptive Weight Functions for Shortest Path Routing Algorithms for Multi-Wavelength Optical WDM Networks", School of EE and CS, Washington State University, Pullman, 99164, 2001, pp. 1330-1334.*

Barry, et al. "Wavelength Routing for All-Optical Networks," *Proc. Allerton Conf.* 11 pages (1993).

Gerstel, et al. "Dynamic Channel Assignment For WDM Optical Networks With Little or No Wavelength Conversion," *Proc. 34th Allerton conf. on Communication, Control, and Computing* 12 pages (1996).

Gerstel, et al. "Dynamic Wavelength Allocation in All-Optical Ring Networks," *Proc. ACM PODC* pp. 1-22, (1997).

Law, et al. "On-line Routing and Wavelength Assignment in Single-Hub WDM Rings" *IEEE J, Selected Areas in Comm.* pp. 1-14 (Oct. 2000).

Li, et al. "A New Algorithm for Reducing the Number of Add-Drop Multiplexers in WDM Optical Ring Networks," 11 pages (1999).

Li "Optimal Resource Placement in Multifiber Mesh-Survivable WDM Networks," 3 pages (1999).

Raghavan, et al. "Efficient Routing in All-Optical Networks," *Proc. of STOC* pp. 1-10 (1994).

Ramaswami, et al. "Routing and Wavelength Assignment in All-Optical Networks," *IEEE/ACM Transactions on Networking* pp. 1-25 (1995).

Atamturk, et al. "On splittable and unsplittable flow capacitated network design arc-set polyhedra," Research report, IEOR, University of California at Berkeley pp. 1-21 (2000).

Banerjee, et al. "A Practical Approach for Routing and Wavelength Assignment in Large Wavelength-Routed Optical Networks," pp. 1-14 (Sep. 1995).

Lee, et al. "Optimal Routing and Wavelength Assignment in WDM Ring Networks," *IEEE J. Selected Areas in Comm.* pp. 2146-2154 (Oct. 2000).

Mukherjee, et al. "Some Principles for Designing a Wide-Area WDM Optical Network," *IEEE Transactions on Networking* vol. 4, No. 5, pp. 684-696 (Oct. 1996).

* cited by examiner

NO CONVERSION

FIXED CONVERSION

FULL CONVERSION

LIMITED CONVERSION

ROUTING AND WAVELENGTH ASSIGNMENT IN OPTICAL NETWORKS

CROSS-REFERENCE TO RELATED APPLICATIONS

This application claims the benefit of U.S. Provisional Application No. 60/295,941, filed Jun. 5, 2001, which is incorporated herein by reference.

STATEMENT AS TO FEDERALLY SPONSORED RESEARCH

This invention was made with government support under ONR N00014-99-1019 awarded by the Office of Naval Research of the Department of Defense. The government has certain rights in the invention.

BACKGROUND

This invention relates to routing, wavelength assignment, network design, and reconfiguration for optical wavelength-division-multiplexed (WDM) networks.

Communication networks can make use of optical communication links between nodes of a network in order to provide a higher communication capacity between nodes than may be available using electrical communication links. For example, a data stream may be used to modulate an optical signal for transmission over a link. At the receiving node the data stream is demodulated to form an electrical signal. The data stream that is encoded in the demodulated electrical signal is then routed to an outgoing optical link where it is used to modulate an outbound optical signal. The maximum data rate of a signal that is routed in such a manner is typically in the order of 10 Gb/s.

More recently, optical links have been used to carry a number of data streams in a frequency multiplexing approach in which each of a number of optical signals at different wavelengths are modulated by different data streams. This approach is known as "wavelength division multiplexing (WDM)." For example, this approach provides an aggregate capacity on each optical fiber that can be in the order of 2 Tb/s using 1000 different wavelengths each carrying a 2 Gb/s data stream. At nodes in the network, one approach to routing data is to optically demultiplex the separate optical signals that arrive at an input port and demodulate each data stream to form an electrical signal. The electrical signals carrying the data streams are then electrically routed to appropriate output ports, where the outbound data streams modulate different wavelength optical signals and the modulated optical signals are multiplexed for transmission over the outbound optical fibers. Certain nodes, called access nodes or access stations, provide interfaces for data signals passing to or from the network, while intermediate routing nodes pass the optical signals between links within the network.

Rather than routing optical signals at intermediate nodes by converting the data streams to electrical signals, all-optical networks have been developed in which optical signals are passed between ports of intermediate nodes without electrical conversion. In such a network, a node can perform wavelength routing in which the node is configured such that optical signals are routed between particular ports of the node according to their wavelengths without conversion to electrical signals. For instance, the node can be configured such that optical signals arriving at a port at different wavelengths are routed to other ports according to their wavelengths. The configuration of such a wavelength routing node can be static, or can be reconfigurable. Furthermore, a reconfigurable wavelength routing node may allow any combination of routing patterns, or may be constrained, for example by the physical design of the wavelength router, to only allow a subset of routing patterns.

In addition to routing optical signals according to their wavelengths, wavelength conversion devices are available that can change the frequency of an optical signal as it passes through a node. A node that includes both wavelength conversion and wavelength routing capabilities can route optical signals arriving at one wavelength at one port to a different wavelength on another port. As with wavelength routers, wavelength conversion can be static or reconfigurable, and if reconfigurable, may be limited to only a subset of all combinations of wavelength conversion.

In general, the flexibility of static or configurable wavelength routing and wavelength conversion comes at a financial cost and may also result in degradation of optical signals as they pass through the node, thereby limiting data rates or ranges over which optical signals can be transmitted through the network.

An all-optical wavelength routed network allows high data rates to pass between origin-destination pairs of access nodes without electrical conversion at intermediate routing nodes along a path joining the origin-destination pair in the network. A continuous lightpath is set up between a pair of access nodes by configuring the intermediate routing nodes to pass the lightpath along links of the network joining the access nodes. In the absence of wavelength conversion, a lightpath occupies the same wavelength on all fiber links on the lightpath. This is often referred to as wavelength continuity on a lightpath.

If the network supports wavelength conversion in addition to wavelength routing, a lightpath may change wavelength at intermediate nodes along its route and therefore may have different wavelengths on different links along its path. If the routing nodes are reconfigurable, different lightpaths can be established and terminated on an ongoing basis, for example, as the demand for communication capacity between different pairs of access nodes changes.

Establishing a lightpath for a communication session between two access nodes involves both determining a path in the network between the two access nodes and allocating a free wavelength on each of the links on that path. Intermediate routing nodes are then configured to optically couple appropriate wavelengths between successive links on the path to provide a continuous all-optical path between the access nodes. Once established, the entire bandwidth on the lightpath is reserved for this communication session between access nodes until it is terminated, at which time the associated wavelengths become available on all the links along the path.

Assignment of lightpaths to a set of desired connections between pairs of access nodes requires both assignment of a path through the network for each connection, and assignment of a wavelength to each link in each path. It is often desirable to select the assigned routes and wavelength to optimize a particular performance metric. This selection is known as the "routing and wavelength assignment (RWA)" problem. Numerous research studies have been conducted on the RWA problem. Several RWA schemes have been proposed that differ in the assumptions on the traffic pattern, availability of the wavelength converters, and desired objectives. The traffic assumptions generally fall into one of two categories: static or dynamic. In static RWA models the demand is assumed to be fixed and known. That is, all the lightpaths that are to be set up in the network are known beforehand. A typical objective is to accommodate the demand for lightpaths while minimizing the number of wavelengths used on all links. By contrast, in a stochastic/dynamic setting, lightpath requests between source-destination pairs are assumed to arrive one by one at random, and have random terminating times. A typical objective in this case is to minimize the blocking probability for new requests, or the total (perhaps weighted) number of blocked requests over a given period of time.

The RWA problem is critically important in increasing the efficiency of wavelength-routed optical networks. With a good solution of this problem, more customers can be statically accommodated by the given system. In dynamic systems, fewer requests to establish lightpaths are rejected during periods of congestion.

Even in the static case, the typically proposed formulations for optimal lightpath establishment require solution of difficult mixed integer linear programs. In particular, the optimal static lightpath establishment problem without wavelength converters was proven to be NP-complete by showing the equivalence of the problem to the graph-coloring problem. Since the associated integer linear programs are very hard to solve, corresponding relaxed linear programs in which the optimization variables are not required to be integral have been used to get bounds on the desired objective function. Alternative formulations of such relaxed problems have been considered to get tighter bounds. The usefulness of these bounds lies in the fact that they can be used as benchmarks against which performance of various heuristic RWA algorithms can be compared. However, there is no general way of converting an optimal non-integer solution to an optimal integer one.

Due to computational complexity of obtaining an optimal solution to the RWA problem, much of the previous work on the RWA problem has focused on developing efficient heuristic methods. A common approach is to decouple the routing and wavelength assignment steps by first finding a route from a predetermined set of candidate paths for all requested paths and then searching for an appropriate wavelength assignment for each route. However, given that the number of wavelengths is restricted and wavelength converters may not be available at all nodes, a suitable wavelength may not be available on all the links along a chosen route.

Recent work in WDM networks is based on a maximum-load model. In the maximum-load model, the route of each request is given and the problem is to find the minimum number of wavelengths to satisfy a given request set. This is a worst-case model, where no blocking of lightpaths is allowed, and there are no assumptions made on the traffic pattern. The traffic is characterized only by its load, which is the maximum number of lightpaths that can be present over any link in the network. However, this approach to designing a network can result in over-designing the network and using many wavelengths to support a typical request patterns.

Most of the literature on the RWA problem considers either networks without any wavelength converters or networks with wavelength converters at every node. The benefits of wavelength conversion have been analyzed under different traffic models. However, the high cost of full wavelength conversion at every node has led to research on networks with sparse wavelength conversion. In a network with sparse wavelength conversion, only a fraction of the nodes are equipped with wavelength converters.

SUMMARY

In a general aspect, the invention features a method for solving routing and wavelength assignment (RWA) problems for all-optical networks. The method involves formulating a joint optimization problem in which the routing of lightpaths and assignment of wavelengths on links of those routes to the lightpaths is expressed jointly in terms of a single optimization criterion. Both routes and wavelength assignments are obtained jointly rather than separately one after another, such as by finding routes according to a first criterion and then in tandem trying to assign wavelengths along those routes using another criterion.

This joint formulation has an advantage that a single criterion to be used, and by jointly optimizing both routes and wavelengths together, a jointly optimal solution can be obtained. In general, solving the problems in tandem does not yield a jointly optimal solution according to a common criterion.

The method features formulation of the joint optimization problem as a continuous variable optimization problem with a convex constraint set (a continuous-convex optimization). Integer constraints, for example, related to the fact that any particular lightpath is not permitted to split over multiple routes or over separate wavelengths on a link of its route, are not necessarily represented explicitly by the constraint set. However, the formulation of the objective function is such that although the problem is formulated in terms of continuous optimization variables, optimal solutions to the problem are integer or equivalent to an integer solution, thereby satisfying the integer constraints at an optimal point in the constraints set.

Formulation as a continuous optimization problem has an advantage that a variety of efficient algorithms can be applied to such continuous-convex problems. Such continuous optimization algorithms are generally significantly more efficient than discrete optimization approaches, such as integer programming, in which the integer constraints are explicitly taken into account during the application of the algorithm.

The method further features expressing the optimization problem in terms of an associated linear-constraint/linear-objective problem in which the convex constraint set is characterized by a set of linear inequalities on the optimization variables, and the associated objective function is expressed as a linear function of these optimization variables. The linear-constraint/linear-objective formulation of the associated problem is such that optimal solutions of the associated problem directly yield integer solutions of the underlying optimization problem.

The linear-constraint/linear-objective formulation of the equivalent problem has an advantage that a number of efficient algorithms for such problems can be used.

The method further features applying a linear programming algorithm, such as the Simplex algorithm, to solve the associated linear-constraint/linear-objective problem.

The approach is applicable to a number of different types of all-optical networks, for example, with different topologies and different wavelength conversion capabilities.

In one type of network, all the intermediate nodes in the network include a full wavelength conversion capability. In another type of network, none the intermediate nodes include a full wavelength conversion capability.

In yet another type of network, only a fraction of the intermediate nodes include a full wavelength conversion capability. Application to such a network with sparse wavelength converters is important in part because sparse use of wavelength converters in a network allows for their use at critical nodes in the network without requiring their use at all nodes, including nodes where their cost does not justify their benefit to network capacity. In networks that include wavelength converters, the wavelength converters may allow arbitrary wavelength conversion, or may be constrained to allow only certain patterns of wavelength conversion.

Wavelength routers at nodes may allow arbitrary routing of wavelengths between nodes, or may be constrained to allow only certain patterns of routing.

The approach is application to various types of RWA problem, for example, for networks with different wavelength conversion capabilities, different types of traffic, which can include static as well as dynamic traffic.

One type of problem involves optimal static assignment of a number of lightpaths given the characteristics of the network, including for example, its topology, wavelengths available on each of the links, and wavelength routing and wavelength conversion capabilities at each of the nodes.

Another type of problem involves dynamic assignment of lightpaths as they are requested, or in batched groups, and as other lightpaths are terminated. This type of dynamic problem can include rerouting of existing lightpaths, if desirable or necessary.

Another type of problem involves design of an all-optical network. Such design can include placement of wavelength converters at selected nodes of the network in order to make efficient use of the available wavelengths, or to minimization of the number of wavelengths needed on links of the network.

Aspects of the invention can include one or more of the following features.

The cost function that is minimized includes a sum of a cost for each link in the network, and the cost for a link is an increasing convex function of the number of wavelengths used on that link.

Each increasing convex function is piecewise linear, and the breakpoints occur at integer arguments to the function.

By using increasing convex cost functions for each link, the solutions tend to distribute circuits relatively evenly across the available links, thereby reducing the likelihood of blocking assignment of dynamic circuits due to lack of available wavelengths. By using piecewise linear cost functions with breakpoints at integer values, the solutions of the relaxed linear programming problem tend to be, or are always, integer rather than fractional. This was shown by computational experiments for general network topologies and verified by analysis for topologies of practical significance, such as ring networks under some assumptions. Use of exact penalty functions within this formulation provides a simple and elegant approach to network design and reconfiguration related issues.

In the dynamic setting in which rerouting and reassignment of existing lightpaths are not allowed, the constraints of the linear programming problem further include constraints related to the routes and wavelengths used by previously assigned circuits.

The cost function that is minimized can include a penalty factor that multiplies a penalty term that is zero if an additional set of constraints is satisfied and greater than zero if that additional set of constraints is not satisfied.

The method can be applied to a reconfiguration problem in which the topology or capacity of links in the network change. The penalty term is zero if no circuits are reassigned and increases with additional reassignments.

The cost function to be minimized may include a penalty factor that multiplies a penalty term that is zero if a set of wavelength continuity constraints are satisfied at certain of the nodes and greater than zero if those continuity constraints are not satisfied. The method further includes redesigning the network by adding wavelength converters at some or all of the nodes at which the wavelength continuity constraints of the penalty function are not satisfied.

The cost function to be minimized can include a penalty factor that multiplies a penalty term that is zero if the capacity of all links is not exceeded, and greater than zero if the capacities of some links are exceeded. The method further includes redesigning the network by adding wavelength capacity for links for which the capacity is exceeded. An efficient rounding method for general network topologies takes into account the structure of the cost function.

Other features and advantages are evident from the following description and from the claims.

DESCRIPTION

A number of related formulations based on an approach to the routing and wavelength assignment (RWA) problem are presented in the following sections. Some of these formulations differ according to assumptions regarding the wavelength conversion capabilities at the nodes of an all-optical network. In a first formulation, the nodes of the network are assumed to have no wavelength conversion capabilities. In a second formulation, each node of the network is assumed to have full wavelength conversion capability such that any optical signal passing through a node can have a predetermined wavelength conversion at that node. In a third formulation, certain nodes are assumed to have no wavelength conversion capability, while the other nodes are assumed to have full wavelength capability.

1 RWA without Wavelength Conversion

Figure 1:
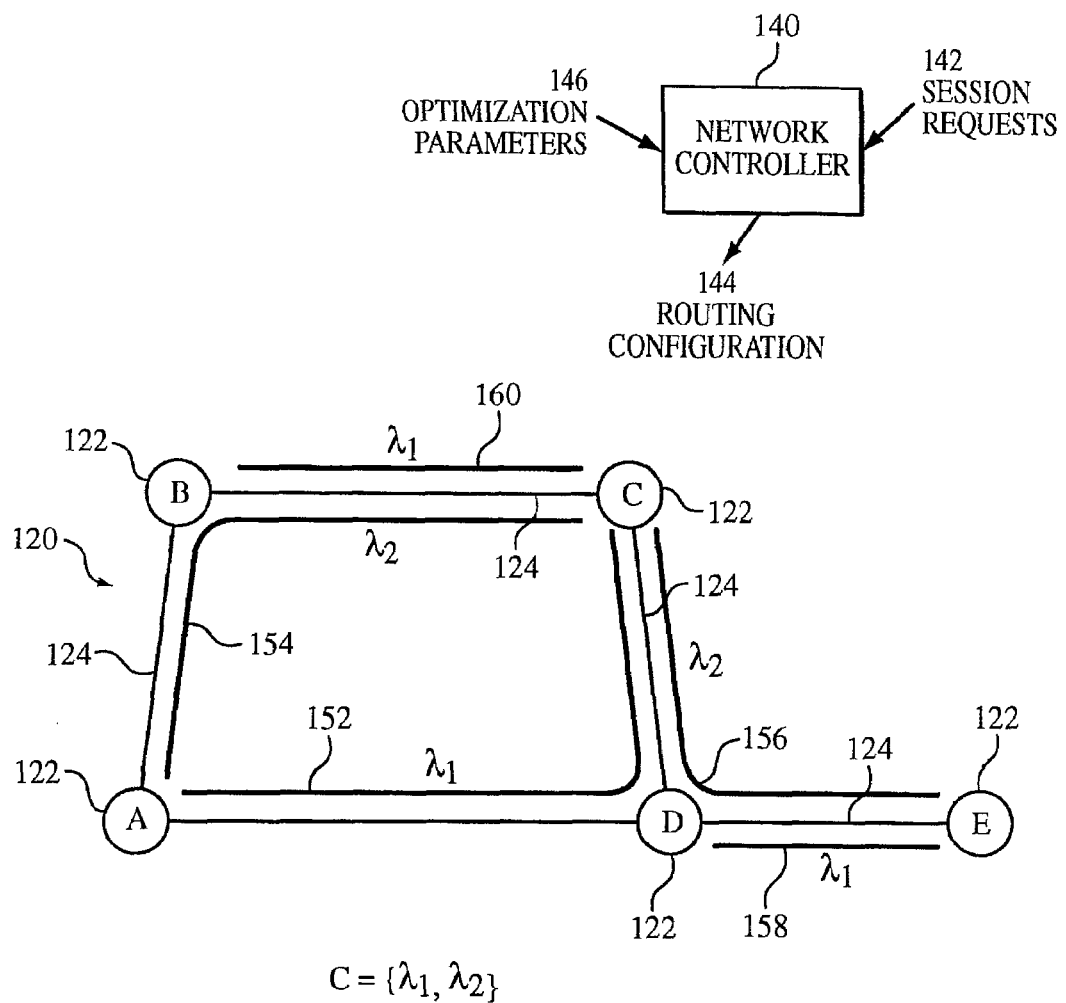
FIG. 1 is a diagram of an all-optical network with lightpaths established between origin-destination pairs of nodes.

Referring to FIG. 1, the first formulation for the routing and wavelength assignment (RWA) problem can be understood by way of an illustrative example. In this example, a 5-node network 120 with nodes A-E 122 has links that each supports communication on a set of two wavelengths (equivalently "colors"), $\lambda_1$ and $\lambda_2$. All nodes 122 function both as access nodes and as intermediate routing nodes in that any node 122 can be an endpoint for a lightpath. Communication sessions are established on uni-directional optical links, one link in the figures represent two fibers laid in opposite directions and bi-directional communication between a pair of nodes involves two paths, one for each direction of communication.

That is, a path through the network is associated with an ordered pair of end-points. The approach is also applicable to RWA for bi-directional optical links with little change to the details of the formulations.

In the discussion below, W designates the set of all origin-destination (OD) pairs of nodes 122 between which lightpaths are to be established. The communication capacity to be established for any OD pair is in units of number of assignable wavelengths, and is therefore an integer. The capacity required for communication sessions between a particular pair of nodes w is signified by $r_w$, which is a nonnegative integer. For any particular pair of nodes 122 w, $P_w$ is a set of paths through the network that link the two nodes of that OD pair w. For example, $P_{B-C}=\{B\text{-}C, B\text{-}A\text{-}D\text{-}C\}$. In the example shown in FIG. 1, session requests 142 includes sessions between four OD pairs w: A-C, C-E, D-E, and B-C, with capacities $r_w$ of 2, 1, 1, and 1, respectively.

In this first formulation, nodes 122 are assumed to not have wavelength conversion capabilities, and therefore lightpaths must occupy the same wavelength on all likes of their respective paths. One of a number of feasible solutions to routing and wavelength assignment of these requested lightpaths is to route one lightpath 152 at wavelength $\lambda_1$ from node A to C through node B (indicated as A-B-C in the figure) and another lightpath 154 at wavelength $\lambda_2$ from node A to C through node D (indicated as A-D-C), thereby satisfying the request for sessions with a total capacity of $r_{A-C}=2$ for OD pair w=A-C. Similarly, the request for OD pair C-E is routed through node D at wavelength $\lambda_2$ 158, the requested lightpath between D-E is routed at $\lambda_1$ 158, and the requested lightpath between B-C is routed at $\lambda_1$ 162.

The routing and wavelength assignment is performed by a central network controller 140 that received session requests 142 and communicates a resulting routing configuration 144 to nodes 122. Network controller 140 computes routing configuration 144 based on session requests 142 and according to optimization parameters 146. In general, network controller 140 computes the routing configuration to be optimal with respect to criteria defined by the optimization parameters.

The general approach to solving the RWA problem, which is common to a number of the formulations, is to minimize a scalar cost, D, which includes a sum of terms that are each associated with different links in the network. The set of all links in the network is denoted L. For any solution to the RWA problem, each link a in L (e.g., a=A-B) has $f_a$ lightpaths assigned to it. In the example shown in FIG. 1, link a=A-B has a total assignment $f_{A-B}=1$. As assignments are in terms of integral numbers of wavelengths, the assignment values $f_a$ are also integer. Each link is associated with a link cost $D_a(f_a)$, which is a scalar function of the scalar integer assignment $f_a$. The total cost that is minimized is then $D=\Sigma_a D_a(f_a)$. That is, the total cost is the sum of the link costs for all the links on the network, and each of the link costs depends on the number of assigned wavelengths on that link. Note that in other formulations of the approach that are described in later sections, the expression for the total cost includes additional terms, such as penalty terms that are related to constraints that cannot necessarily be satisfied.

The cost function $D_a(\ )$ associated with a link a is such that the marginal cost of adding an additional lightpath to a link grows as the number of assigned lightpaths on that link grow, and the cost of exceeding the capacity of the link (i.e., $f_a > C$) is infinite. That is, the cost function $D_a(\ )$ is a convex function of the number of assigned wavelengths, and $D_a(f)$ is infinite for $f > C$. In this example each, each link has the same cost function and has the same assignable wavelengths, C. Therefore, the cost of an equal number of assigned wavelengths on two links is lower than an unequal distribution of the same number of assignment wavelengths on the two links. By choosing such a cost function, minimizing the overall cost D tends to equalize the number of available (unassigned) wavelengths on each link.

As is discussed further below in regard to dynamic assignment of lightpaths, it should be noted that by using a cost function such that the marginal cost of adding a lightpath grows as a link approaches its capacity, the solution to the RWA problem as described above will tend to avoid completely consuming the capacity on any particular link. Depending on the parameters (slopes) of the cost functions, the solution can also tend to increase the minimum unused capacity on the links, for example, by increasing the marginal cost by a large factor for each additional assigned lightpath.

Each link does not necessarily have the same cost function. For example, the cost functions can be selected so that the relative unassigned capacity on each link is related to an expected need for that capacity in later dynamic assignment of lightpaths. That is, the costs can be chosen such that a link that is expected to be required for a greater number of dynamic requests tends to have a larger amount of unused capacity than a relatively less required link.

The routing and assignment problem is formulated in terms of a set of indicator variables, $x_{p,c}$, where p is a path through the network that belongs to the set of all paths through the network, P, that may be used to couple origin-destination (OD) nodes of the network, and c is a wavelength from the C possible wavelengths. The value of $x_{p,c}$ is 1 if path p makes use of wavelength c on all the links on path p, and zero otherwise. The total number of lightpaths assigned to a link a is denoted $f_a$ and is equal to the sum of $x_{p,c}$ for all paths p which traverse link a, and all wavelengths c on link a.

Figure 2A:
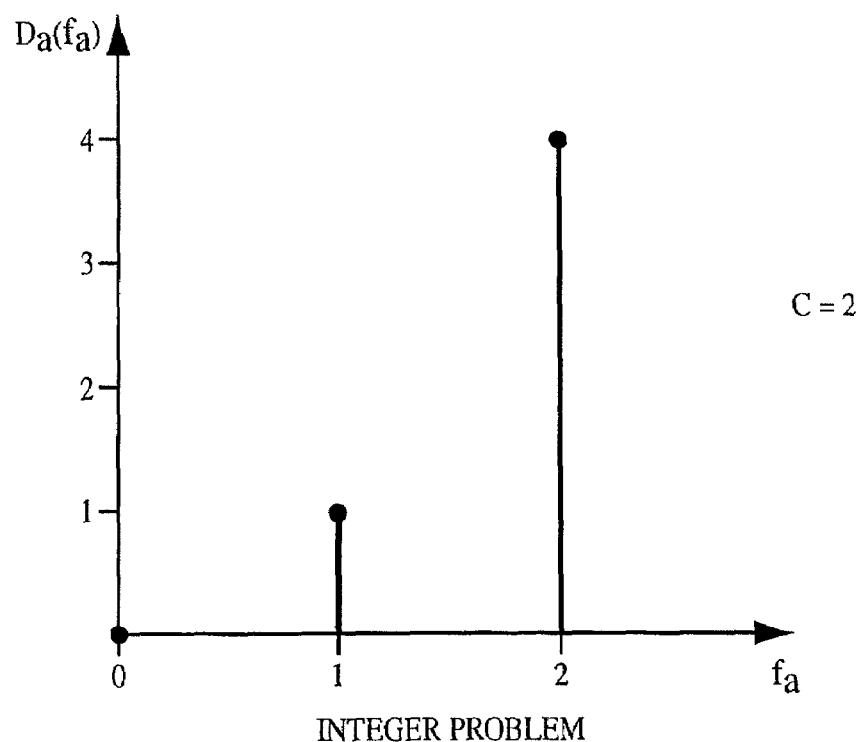
FIG. 2A is a cost function routing and wavelength assignment problem.
Figure 2B:
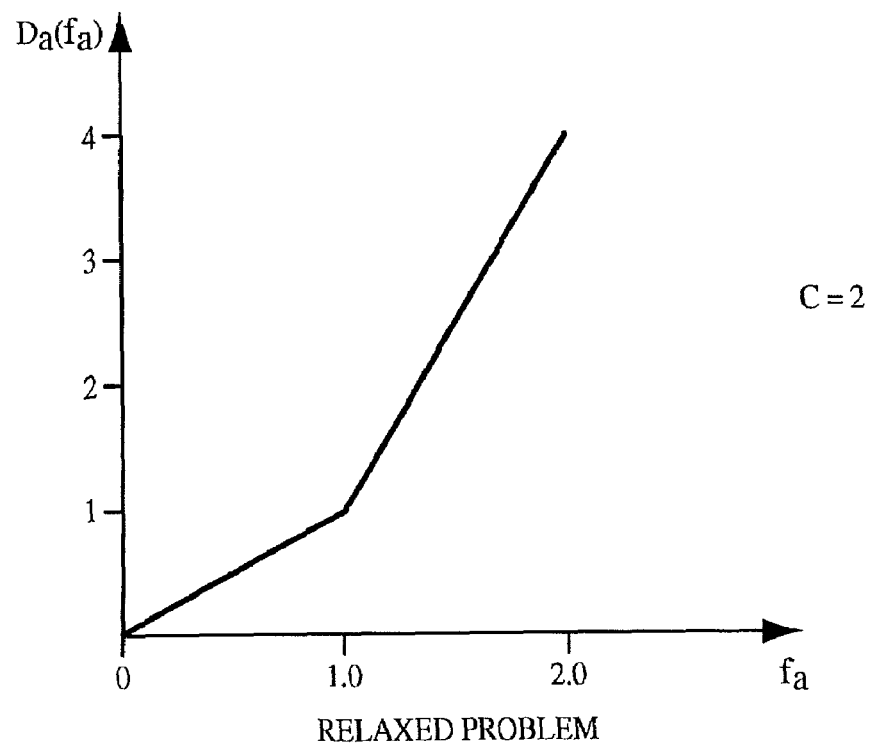
FIG. 2B is a cost function for an integer-relaxed version of the problem.

Rather than searching for integer values of the optimization variables $x_{p,c}$, the approach makes use of a relaxed optimization problem. In this relaxed problem, the values of $x_{p,c}$, and therefore the assigned flows $f_a$, are not constrained to be integers. The link cost functions for the relaxed problem, $D_a(f_a)$, are defined on a continuous domain in which $f_a$ can range from 0 to C. In the relaxed problem, the values of $D_a(f_a)$ are equal to the values for the corresponding cost functions of the integer problem at integral values of $f_a$. The values of fractional values of $f_a$ are defined by using a piecewise linear form for $D_a(f_a)$. Referring to FIG. 2A, a link cost function for the underlying integer problem is illustrated for a link with C=2 assignable wavelengths. In FIG. 2B, the corresponding continuous, piecewise linear, link cost function for the relaxed problem is illustrated.

The relaxed problem therefore forms a continuous optimization problem in the continuous-valued optimization variables $x_{p,c}$ in order to optimize the continuous-valued optimization function D, which is the sum of the link costs $D_a(f_a)$. The optimization problem is subject to a set of constraints on allowable values of the set of $x_{p,c}$. A first set of constraints relates to there being at most one wavelength c is assignable to any particular path p. These constrains are expressed as $0 \leq x_{p,c} \leq 1$ for all values of p and c.

A second set of constraints relates to satisfying the requested capacity between the OD pairs of nodes. In order to satisfy the requested capacity $r_w$ for any OD pair w, the sum of $x_{p,c}$ for all wavelengths c for all paths p in $P_w$ must be equal $r_w$. This can be expressed as $\Sigma_c \Sigma_p$ in $_{P_w} x_{p,c} = r_w$ for all w.

These two sets of constraints define a convex region, which in this formulation is a polyhedral region, within which the values of $x_{p,c}$ can range. Therefore, the relaxed problem is a continuous convex optimization problem.

Figure 3:
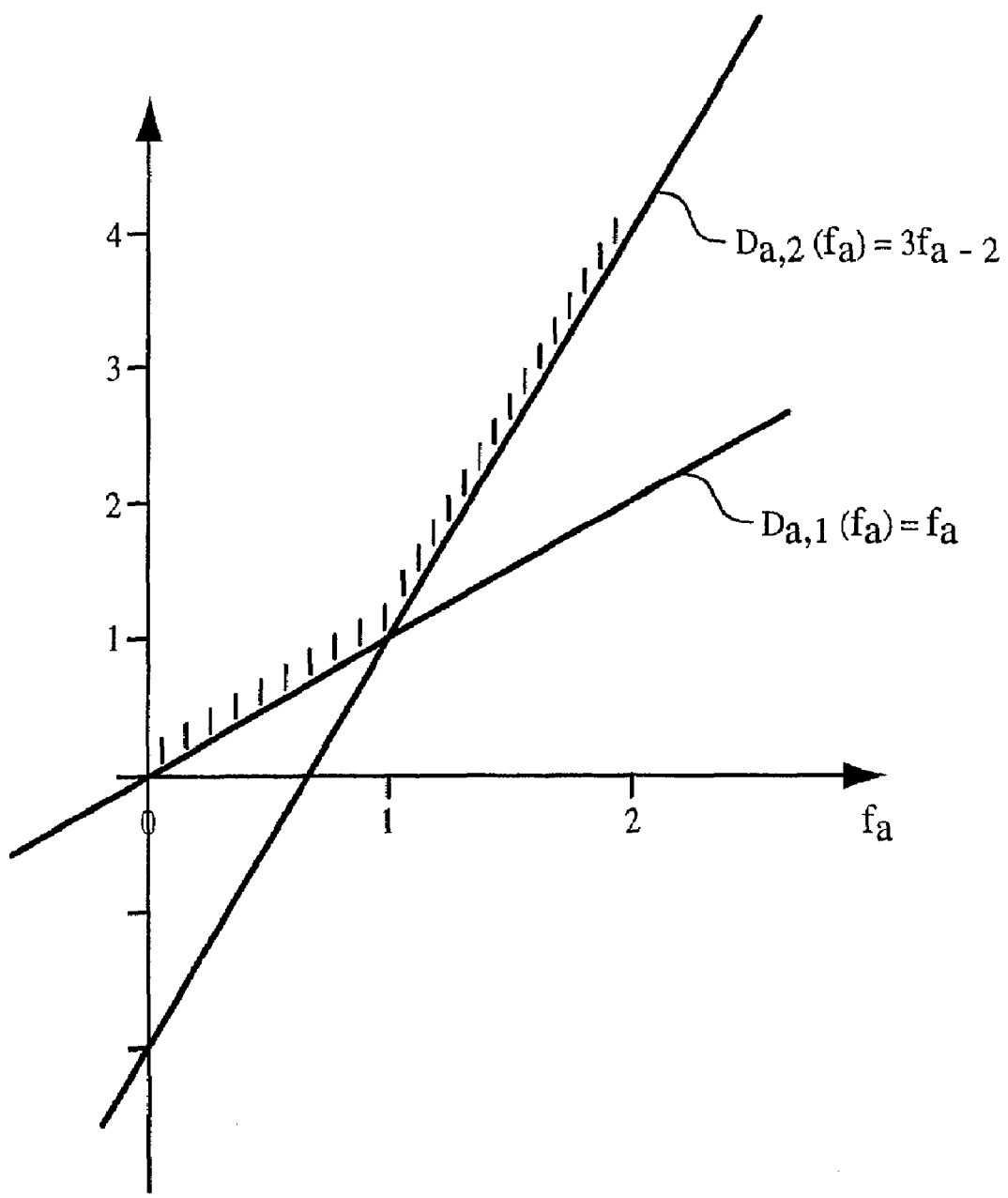
FIG. 3 is a diagram that illustrates expressing a link cost function as a maximum of a number of linear functions.

The relaxed continuous problem is converted to a third form, an associated (relaxed) problem in which the objective function is linear as well. In particular, rather than minimizing $D=\Sigma_a D_a(f_a)$, the objective is to minimize $Z=\Sigma_a Z_a$. Each link cost function $D_a(\ )$ is expressed as a maximum of a number of linear functions, $D_{a,1}(\ ), D_{a,2}(\ ), \ldots D_{a,C}(\ )$. For example, referring to FIG. 3, the piecewise linear cost function shown is FIG. 2B, in which $D_a(0)=0$, $D_a(1)=1$, and $D_a(2)=3$, is expressed as the maximum of $D_{a,1}(f_a)=f_a$ and $D_{a,2}(f_a)=3f_a-2$. In general, with C wavelengths, each link cost function $D_a(\ )$ can be expressed as a maximum of C linear functions. Based on these linear functions, an additional fourth set of constraints on the optimization variables are introduced as $Z_a \geq D_{a,c}(f_a)$ for all links a and wavelengths c.

The resulting associated relaxed problem is then converted into a standard form for a solution using a linear programming algorithm. One such form is to minimize $\underline{c}^T \underline{y}$ subject to $A\underline{y}=\underline{b}, \underline{y} \geq 0$, where $\underline{c}, \underline{y}$, and $\underline{b}$ are column vectors and A is a matrix. The optimization variables represented in $\underline{y}$ include the variables $Z_a$, which are represented as a vector $\underline{z}$, as well as the indicator variables $x_{p,c}$, which are represented as a vector $\underline{x}$. The optimization variables are therefore partitioned, $\underline{y}^T=(\underline{z}^T, \underline{x}^T)$ and the cost vector is correspondingly partitioned and has the form $\underline{c}^T=(\underline{1}^T, \underline{0}^T)$, where $\underline{1}^T$ is a vector of all 1's and $\underline{0}^T$ is a vector of all 0's. Each of the four sets of constraints corresponds to a different range of rows of the matrix A, and a corresponding range of rows of the vector $\underline{b}$.

The linear programming algorithm is implemented in a commercially available software package called CPLEX, which is available from ILOG, Inc. CPLEX implements a version of the Simplex algorithm for solving linear programs. After CPLEX obtains an optimal value for $\underline{y}$, the values of the indicator variables $x_{p,c}$ are obtained from corresponding entries in the optimal value of $\underline{y}$. The routing and wavelength assignments to satisfy the capacity requirements for all the OD pairs are directly determined based in the values of the indicator variables.

Although linear programming problem is expressed in terms of continuous variables, the real-valued optimal values for the indicator variables $x_{p,c}$ are typically either 0.0 or 1.0 (or very close to those values due to limits of numerical precision). This results at least in part from the presence of break points (discontinuities in the first derivative) in the convex continuous link cost functions $D_a(\ )$ at integer values of its argument. Therefore, the optimal values of entries of the $\underline{y}$ are converted to integer form when determining the optimal values of the indicator variables $x_{p,c}$.

The inventors have proven that for certain classes of networks, in particular for line networks and ring networks, an integer solution provides the optimal value for the continuous optimization problem. Furthermore, the nature of the Simplex algorithm appears to yield an integer solution, even if an equal cost fractional solution exists. In addition, based on experimentation with a wide range of network topologies, the inventors conjecture that the approach yields integer solutions for a large class, if not all, network topologies.

In the unexpected event that the linear programming algorithm yields a fractional solution, the approach involves a final step that converts the fractional values of the indicator variables to yield an integer solution. One version of this final step uses a heuristic approach involving rounding fractional indicator variables up to 1, and then selecting paths and wavelength assignment for each of the requested flows that can be accommodated by these rounded indicator variables. Note that application of such heuristics may not yield an optimal solution. However, even if some of the indicator variables are fractions in the optimal solution to the problem, then based on the experimental results the inventors expect that most of the variables will still be integer, and therefore application of the heuristics to yield a totally integer solution will yield a close to optimal solution. The heuristic approach takes into account structure of the cost function when rounding variables.

Other alternative versions of this final step are discussed further in later sections. Some of these version are guaranteed to yield optimal solutions for particular classes of networks.

2 RWA with Full Wavelength Conversion at All Nodes

In the second formulation of the general approach to the RWA problem all nodes have full wavelength conversion capabilities as opposed to no node having such capabilities in the first formulation. That is, any wavelength on one link at a node can be routed to any other wavelength on another link at that node.

In this formulation, the set of indicator variables is index only on the path p, $x_p$, and indicates the share of the required capacity between the endpoints of path p assigned to path p. As in the first formulation, the flow $f_a$ on a link a is equal to the sum of $x_p$ for all paths p that traverse link a.

Each indicator variable is constrained to be non-negative, and not to exceed the number of wavelengths available on all links of its associated path. Assuming that each link has C assignable wavelengths, the first set of constraints is $0 \leq x_p \leq C$. Note that the upper bounds of these constraints are redundant with the requirement that D(f) grow to infinity for f>C, and therefore, the first set of constraints is set to $0 \leq x_p$ for all paths p.

The second set of constraints again relates to satisfying the requested capacity between the OD pairs of nodes. In order to satisfy the requested capacity $r_w$ for any OD pair w, the sum of $x_p$ for all paths p in $P_w$ must be equal $r_w$. This can be expressed as $\Sigma_{p \ in \ P_w} x_p = r_w$ for all w.

The relaxed problem in this second formulation is converted to the third form with a linear objective function using the same approach as in the first formulation, and solved using the linear programming software.

Optimal indicator variables, $x_p$, are typically integral, and for certain classes of networks, provably integral. As in the first formulation, if fractional values result from the application of the linear programming software, either heuristics for "rounding" the variables to integer values, or other approaches to this step of obtaining integer values that are described in later sections are applied.

Having obtained a feasible set of integral indicator variables, $x_p$, the wavelengths at assigned to each of the paths, for example, in a greedy manner. Because each node has full wavelength conversion capability, any of a number of different wavelength assignments are compatible with the routing obtained using the linear programming approach.

3 RWA with Sparse or Limited Wavelength Conversion

In the third formulation, some nodes have no wavelength conversion capabilities while others have full wavelength capabilities in a sparse arrangement of wavelength converters. In this formulation, the set of indicator variables include $x_{p,c,a}$, where p is a path, c is a wavelength, and a is a link on path p in the network. The indicator variable $X_{p,c,a}$ is 1 if path p is assigned wavelength c on link a of the path, and 0 otherwise. Recall that in the first formulation, the indicator variables are not indexed by wavelength as the lightpath occupies the same wavelength on all links of the path.

As in the first formulation, the first set of constraints relates to there being at most one wavelength c is assignable to any link a of any path p. These constrains are expressed as $0 \leq x_{p,c,a} \leq 1$ for all values of path p, wavelength c, and link a on path p.

Also as in the first formulation, the second set of constraints relates to satisfying the requested capacity between the OD pairs of nodes. In order to satisfy the requested capacity $r_w$ for any OD pair w, the sum of $x_{p,c,a(p,1)}$ for all wavelengths c for all paths p in $P_w$ where $a(p,1)$ is the first link on path p must be equal $r_w$. This can be expressed as $\Sigma_c \Sigma_{p\ in\ Pw} x_{p,c,a(p,1)} = r_w$ for all w.

In this third formulation, a third set of constraints relate to wavelength conversion at nodes of the network. At a node of the network at which there is no wavelength conversion capability, the wavelength on any path through that node is continuous at that node. This wavelength continuity constraint is expressed in terms of the indicator variables as $x_{p,c,a1} = x_{p,c,a2}$ for any successive pair of links $a_1$ and $a_2$ on any path p where links a1 and a2 are couple by that node, which does not have a conversion capability.

At nodes with full wavelength conversion capability third set of constraints are expressed as $\Sigma_c x_{p,c,a1} = \Sigma_c x_{p,c,a2}$ for all successive sequences of links $a_1$ and $a_2$ on all paths p where links a1 and a2 are couple by that node. That is, the number of assigned wavelengths on a path must be the same on both links of the path at any node on the path.

As in the first formulation, linear programming software is used to solve the associated relaxed optimization problem. Optimal indicator variables, $x_{p,c,a}$, are typically integral, and for certain classes of networks, provably integral. As in the first formulation, if fractional values result from the application of the linear programming software, either heuristics for "rounding" the variables to integer values, or other approaches to this step of obtaining integer values that are described in later sections are applied.

Having obtained a feasible set of integral indicator variables, $x_{p,c,a}$, the wavelengths at one each link of each path are determined by the non-zero indicator variable for that path and link.

4 Alternative Formulations

The third formulation, in which indicator variables are indexed $x_{p,c,a}$ according to path p, wavelength c, and link a, is applicable to situations in which all the nodes or none or the nodes have wavelength conversion capabilities.

Other alternative formulations use different indicator variables. For example, for paths along which there are no wavelength converters, the link index is redundant because the same wavelength is used on all links, and therefore for some paths p both a wavelength and link index are needed while for other paths only a wavelength index is needed.

Other formulations do not necessarily use similar variables, but are nevertheless continuous optimizations of variables bounded in a convex region.

5 Limited Wavelength Conversion Capabilities

Figure 4A:
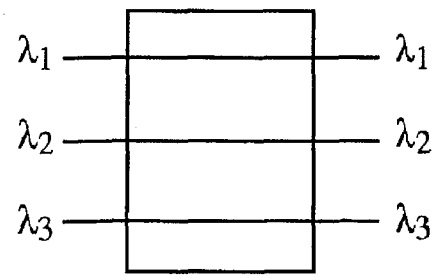
FIGS. 4A-D are diagrams that illustrate various configurations of wavelength conversion at a node.

In yet other formulations, nodes do not necessarily allow arbitrary wavelength conversions. Referring to FIGS. 4A-4D, several different nodes with two links each are illustrated with different capabilities for wavelength conversion. In these formulations, each link carries three wavelengths, $\lambda_1$, $\lambda_2$, and $\lambda_3$. FIG. 4A shows a node with no wavelength conversion, as are the nodes in the first formulation discussed above. FIG. 4C shows a node with full wavelength conversion, as are the nodes in the second formulation discussed above.

Figure 4B:
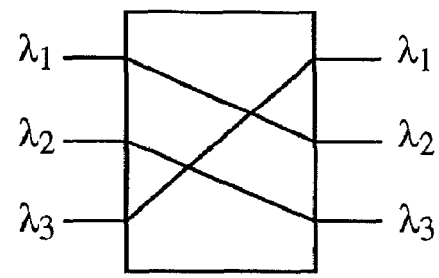
Figure 4C:
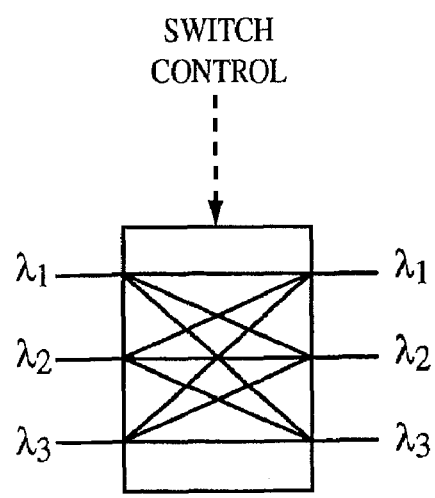

FIG. 4B shows a node that has fixed wavelength conversion. For example, wavelength $\lambda_1$ on the link to the left of the node is coupled to wavelength $\lambda_2$ on the link to the right of the node. In an example network with nodes of this type, the third set of constraints have the form $x_{p,c1,a1} = x_{p,c2,a2}$ for all successive sequences of links (a1,a2) on all paths p at a node with fixed wavelength conversion for all pairs of coupled wavelengths (c1,c2) on those links.

Figure 4D:
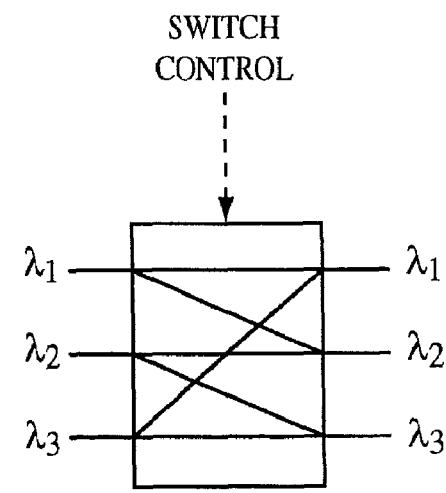

FIG. 4D shows a node that has configurable wavelength conversion, but only some conversions are possible. For example, a wavelength $\lambda_1$ on the link to the left of the node can be converted to either wavelength $\lambda_1$ or $\lambda_2$ but not to wavelength $\lambda_3$. For this type of limited conversion capability, as well as a variety of other constraints on patterns of wavelength conversion, additional constraints are added to the third set such that the resulting problem remains convex and only allowed wavelength conversions are feasible. For example, in the example in FIG. 4D, all paths assigned to wavelength $\lambda_1$ on the link on the left, $a_1$, must be coupled to either wavelength $\lambda_1$ or $\lambda_2$ on the link on the right, $a_2$. This is expressed as the linear constraint $x_{p,\lambda1,a1} = x_{p,\lambda1,a2} + x_{p,\lambda2,a2}$. Therefore, in general, for each node that has limitations on the wavelength conversions available, the third set of constraints are augmented to represent those limitations.

6 Network Design Using Penalty Functions

In the formulations described above, if a feasible solution to the problem exists, application of the Simplex linear programming algorithm to the associated relaxed optimization problem will yield an optimal feasible solution, which is typically an integer solution, at least for the classes of network topologies that the inventors have proven this to be guaranteed. However, it is possible that given the constraints, no feasible solution exists to satisfy all the capacity requirements $r_w$ without violating the constraints. This situation arises in another application of the general approach described above in a problem of network design. Here the design issue is to determine at which nodes wavelength conversion is needed in order to satisfy a set of capacity requirements.

In this design formulation, the network topology is fixed, and some or all nodes have no wavelength conversion capabilities. We assume that the approach to the routing and wavelength assignment problem described above does not yield a feasible solution. That is, all the capacity requirements between pairs of nodes cannot be satisfied by the network as it is configured.

Infeasibility generally arises because of inadequacy in the number of wavelength converters in the network, which requires that wavelength continuity constraint be satisfied along more lightpaths with no converters. In this design formulation, the set of constraints related to wavelength continuity are relaxed as if there were full wavelength converters at all nodes, such that the third set of constraints is as in the third RWA formulation discussed above assuming that all nodes have full wavelength conversion capabilities.

The cost function is augmented by adding a penalty term that prescribes a high cost to assignments which violate the wavelength continuity constraints at nodes that do not truly have wavelength conversion capability. Associated with the penalty term in the cost function is a penalty parameter $\gamma$ that determines the degree of penalty and as a result, the extent to which this alternative penalized problem approximates the original. As $\gamma$ increases, the approximation becomes more accurate.

For example, a wavelength continuity constraint that $x_{p,c,a1} = x_{p,c,a2}$ for all successive sequences of links (a1,a2) at a node without wavelength conversion on all paths p for all wavelengths c corresponds to a penalty term on the cost function of $\gamma \Sigma_{(a1,a2)} \Sigma_p \Sigma_c |x_{p,c,a1} - x_{p,c,a2}|$.

The associated relaxed problem is formulated using this cost function, and $\gamma$ is chosen to be large enough so that if there were a feasible solution, all the constraints would be satisfied. Then the Simplex algorithm is applied, and the nodes at which the wavelength continuity constraints are not satisfied are identified as requiring wavelength converters.

A number of alternative variations of this approach can be used. For example, only some of the nodes without wavelength conversion can be considered as possible targets for new wavelength converters, and only those nodes would have corresponding penalty terms in the cost function. Also, rather than necessarily concluding that full wavelength conversion is needed at any node at which the optimal solution involved any wavelength conversion, an iterative approach is used in which only some, possibly limited, wavelength converters are introduced and the algorithm is then applied again. Furthermore, the constraints and cost function can be formulated such that once any wavelength conversion is needed at a node, additional wavelength conversion at that node does not increase the overall cost, thereby yielding the minimum additional nodes at which wavelength converters need to be added.

In another formulation of a network design problem the design parameter to be determined is the capacity on particular or all links of the network. In one formulation of this design problem, the network topology is fixed, and each link has at least a capacity of C wavelengths. For a particular set of capacity requirements between origin-destination nodes of the network, no feasible solution exists using only the C wavelengths on each link. Therefore, a sufficient number of additional wavelengths are allowed, but with an associated incremental cost (slope of the piecewise linear cost function) that is so high that these wavelengths are not used in an optimal solution if it is at all possible to satisfy the given lightpath requests with the existing C wavelengths. When, however, the number C is inadequate, the optimal solution of the penalized problem will provide an indication of the minimal number of additional wavelengths needed to satisfy the given lightpath requests.

7 Dynamic Routing

The first three formulations of the RWA problem that are discussed in the previous section are described as static problems in which all the capacity requirements between pairs of nodes are known ahead of time, and a fixed assignment of routes and wavelengths is determined and then fixed.

More generally, requests to establish sessions with particular capacity, and later requests to terminate those sessions, occur over time. A goal for a dynamic routing and wavelength assignment approach is that requests for new communication sessions are not blocked because there is no route and wavelength assignment available without rerouting existing sessions. In general, rerouting of existing sessions is impossible or is costly and should be avoided. As introduced above, the convex cost functions used in the optimization problems tend to yield solutions that leave unused capacity on each of the links.

In a first formulation for dynamic routing, as sessions are terminated, resources associated with those sessions are freed up. When a new session is requested, say between an origin destination pair of nodes w and capacity $r_w$, a variant of one of the static formulations is used. In particular, an additional set of constraints is introduced that require that the existing assignments are unchanged, that is, if an indicator variable $x_{p,c,a}$ is 1 before assigning the new session, it is constrained to remain 1. The optimal solution is then obtained using the linear programming algorithm, and the new session is routed according the optimal solution.

It is possible that a new session cannot be routed through the network without violating the constraints. In a system in which existing sessions cannot be rerouted, the new session is rejected or blocked until some other session terminate and frees up needed resources.

In a system in which existing sessions can be rerouted to accommodate a new request, an exact penalty formulation is used to prefer to keep existing sessions fixed, but allow rerouting if it is the only way to find a feasible way of admitting a new sessions. Rather than introducing the constraints that require the existing indicator variable that are 1 to remain 1, a penalty term is added to the cost function. One suitable choice of cost function is $\gamma \Sigma_{p,c,a} 1 - x_{p,c,a}$ where the sum is over the indicator variables $x_{p,c,a}$ that are 1 in the existing solution.

In this approach, for a suitable large value of $\gamma$, if the new session or group of sessions can be routed without rerouting any of the existing sessions, the optimum solution will keep the existing sessions fixed. If keeping the existing session fixed while admitting the new sessions is not feasible, the optimum solution will tend the reroute a relatively small number of existing sessions.

Other approaches to the dynamic routing problem make use of an exact penalty function, with different characteristics regarding the cost of rerouting. For example, for example, once a wavelength assignment on a link of a particular path is to be changed, additional changes on that path may be penalized less.

8 Obtaining Integer Solutions

As discussed above, solution of the associated relaxed linear programming problems in practice yield integer optimal (within numerical error) solutions, which translate directly into feasible integer solutions of the RWA problems.

Extensive computational evidence with a variety of network topologies and a variety of traffic patterns suggests that, even when integer constraints are relaxed, any of the given formulations have integer optimal solutions for majority of network topologies and traffic patterns that are encountered in practice.

For certain classes of network topologies and cost functions, the inventors have proved that an integer optimal solution to the relaxed problem exists. Although an optimal integer solution exists, and appears to be consistently found using the formulations and computational techniques described above, other non-integer solutions that achieve the same cost, and are therefore also optimal, may also exist. In principle, application of the Simplex algorithm or some other linear programming algorithm to the relaxed problem could yield such an optimal but non-integer solution.

An alternative final step that is applied when the solution obtained by the linear programming algorithm is fractional is guaranteed to yield an equal cost integer solution for some special but significant topologies. The proof that an equal cost integer solution can be found is done by means of an iterative algorithm that starts with a fractional optimal solution, and at each step modifies the link flows, $f_a$, without changing the overall cost, D. In general, the algorithm finds a cost preserving "direction" that yields another optimal solution with less number of fractional components, and terminates with an integer optimal solution in finite number of steps. The "direction" corresponds to an incremental deviation of flow between OD pairs from one path to another while maintaining the overall required flows $r_w$. The essence of the proof is that because of the structure of the cost functions $D_a(\ )$ and the topology of these networks, a cost preserving direction can be found in each step while satisfying the overall demand $r_w$.

In this section, we focus our attention to specific network topologies including line and ring networks. We consider such networks with no wavelength conversion or full wavelength conversion capabilities, as addressed by the first and the second formulations described above, respectively. We show that under certain assumptions, the relaxed versions of problems in these formulations have integer optimal solutions, which are also optimal for the integer-constrained problems.

In the discussion below, the topology of the network is characterized by a graph G=(V,L), where V is the set of nodes and L is the set of links.

8.1 Line Networks

We first consider the case where the network is characterized by a graph G that forms a line. That is, the nodes of the network 1, . . . , n are linearly arranged so that each node i is directly connected to i−1 and i+1, except if i=1 or i=n, in which case i is directly connected to node 2 or node n−1, respectively. In the line network, there is a single available path for each OD pair. Therefore, given a set of OD pairs, the set of paths are determined and we are interested in the wavelength assignment problem only. Recall that a wavelength assignment for a given set of paths assigns wavelengths to each link of each path such that no link gets the same wavelength for two different paths passing through it. We say that a wavelength assignment has no wavelength conversion if every path is assigned the same wavelength on all of its links.

An interesting result, shown in the context of graph coloring problems, is that if the number of paths crossing every link is less than or equal to the number of available wavelengths, which is a necessary condition for feasibility of the formulations, then there is a wavelength assignment with no wavelength conversion. In other words, the problem is feasible with wavelength conversion if and only if it is feasible without wavelength conversion. We prove it constructively with an efficient algorithm.

Proposition 1: Consider a line network with multiple OD pairs. Suppose that the number of paths crossing any link is less than or equal to the number of available wavelengths. Then there exists a wavelength assignment with no wavelength conversion.

Proof: Consider first the rightward directed paths determined by the given set of OD pairs and assume that these paths are ordered from left to right, based on the location of their origins. We assign wavelengths to paths consecutively in the following way: We start with path 1 and assign the first available wavelength to path 1 on all of its links. For path k, we search for an available wavelength on its first link. In view of the assumption that the number of paths crossing any link is less than or equal to the number of wavelengths, it is possible to find an available wavelength c on this link.

We claim that wavelength c is also available on all the subsequent links of path k and therefore can be assigned to path k on all these links. To see this, suppose that wavelength c is not available on one of the subsequent links. This means that wavelength c is assigned to a path i on this link, for some i<k, implying that wavelength c is also assigned to path i on the first link of path k, which is a contradiction. A similar argument works for the leftward directed paths. Hence, there exists a wavelength assignment with no wavelength conversion. QED.

8.2 Ring Network with Full Wavelength Conversion

Consider next the case where G is a ring and there is full wavelength conversion capability at every node. Any feasible solution of the relaxed version of problem specifies a set of paths together with the path flows that carry the input traffic of the OD pairs (also referred to as a routing). Any integer feasible solution corresponds to a routing in which all origins send their input traffic completely along a single path. Similarly, a fractional feasible solution (a feasible solution in which some of the variables are noninteger) corresponds to a routing in which some of the origins divide their traffic between alternative paths.

Figure 5:
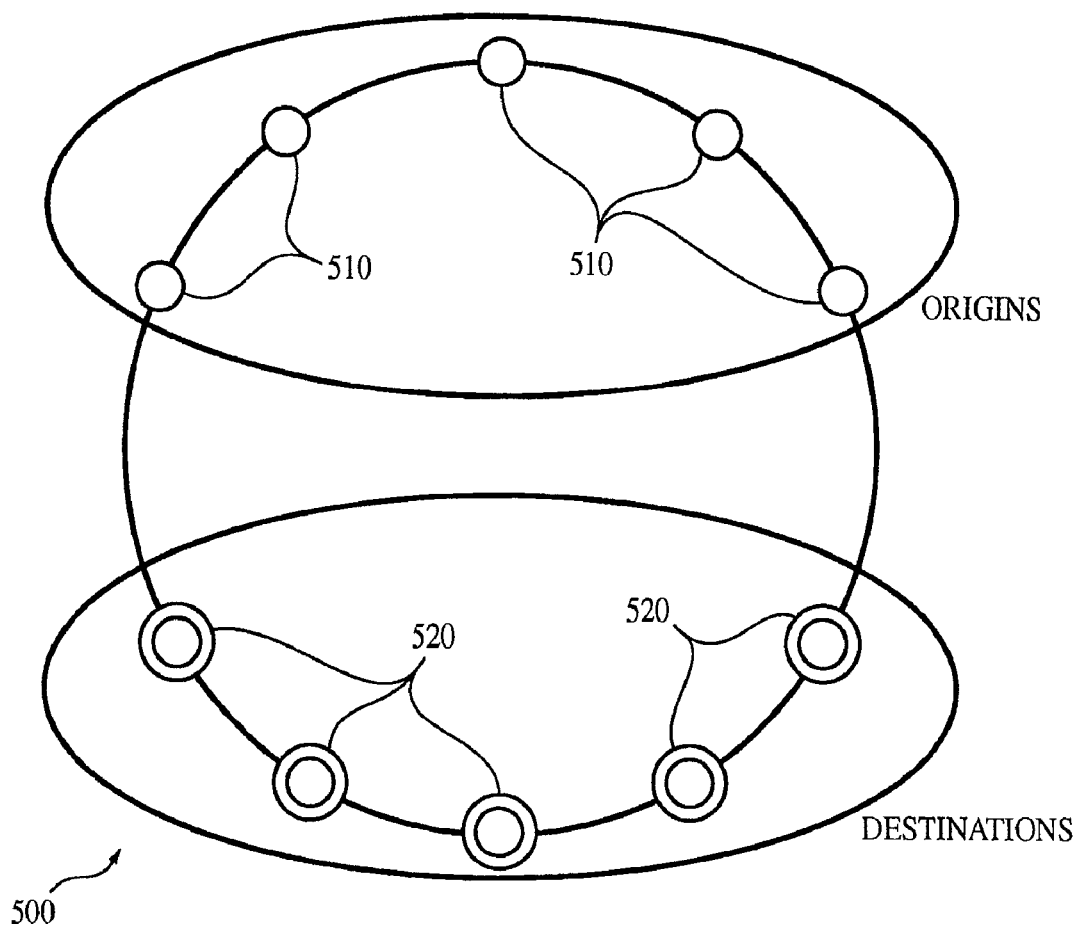
FIG. 5, 6A-B, and 7 are diagrams of ring network examples.

Referring to FIG. 5, we consider a ring network 500 with multiple OD pairs in which the origin nodes 510 and destination nodes 520 are located such that the ring can be separated in two pieces by removing two links with one of the obtained pieces containing all the origins and the other containing all the destinations. We say that in such a network, the origins and the destination can be separated. In the following, we prove that for a ring network where the origins and the destinations can be separated, the relaxed version of problem has an integer optimal solution.

We first show the following proposition related to optimal fractional solutions of the relaxed version of problem. We say that n OD pairs of the ring network interleave if it is not possible to separate the ring into two pieces by removing two links so that any two of the OD pairs are entirely contained in one of the pieces.

Figure 6A:
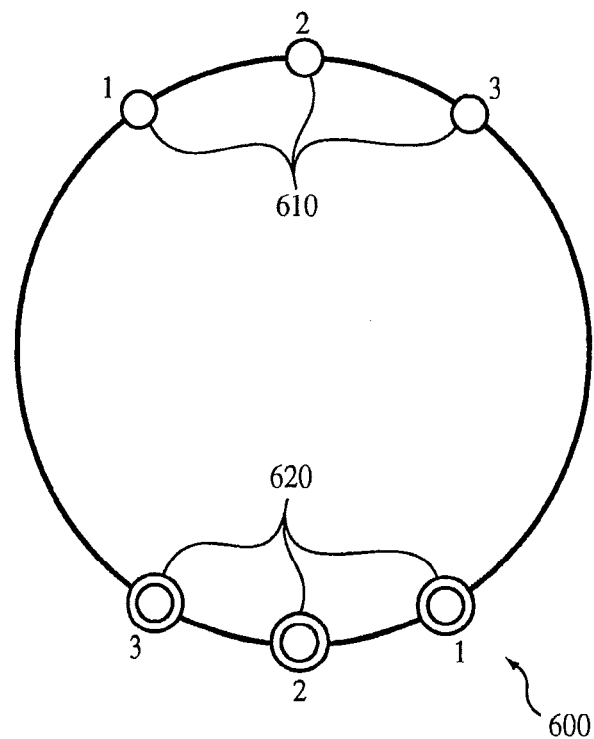
Figure 6B:
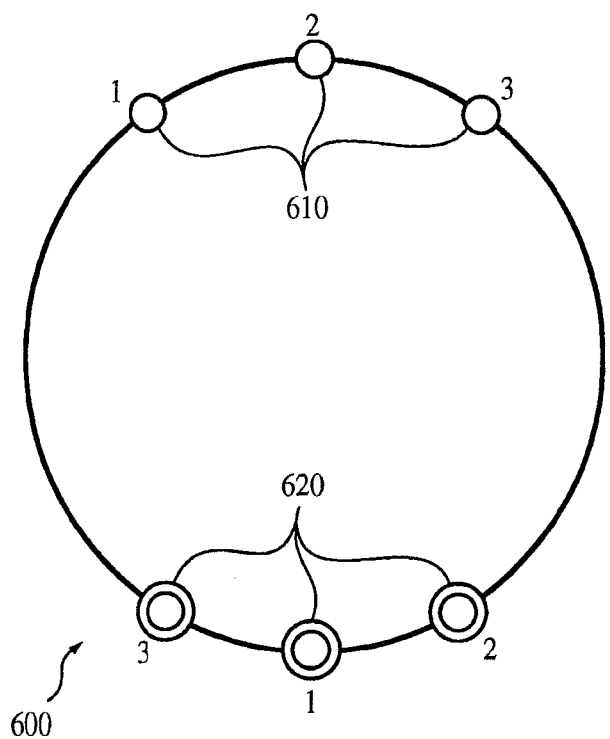

Referring to FIGS. 6A-B, a ring network 600 has three OD pairs, each with a different origin node 610 and destination node 620. Network 600 in FIG. 6A differs from the network in FIG. 6B according to which nodes form the OD pairs. The origin and destination nodes are labeled 1-3 according to which OD pair they are members.

In FIG. 6A, the three OD pairs shown interleave. That is, it is not possible to separate the ring into two pieces by removing two links so that any two of the OD pairs are entirely contained in one of the pieces.

In FIG. 6B, the three OD pairs shown do not interleave, i.e., the ring can be divided in two pieces by removing the link between the origins of OD pairs 1 and 2, and the link between the destinations of OD pairs 1 and 2, such that each of the pieces obtained contains exactly one of these OD pairs.

Proposition 2: Consider a ring network with multiple OD pairs such that the origins and the destinations can be separated. In any optimal fractional solution of the relaxed version of problem for this network, all OD pairs that divide their traffic between alternative paths interleave.

Proof: Suppose to arrive at a contradiction that two of the OD pairs, say OD pair 1 and 2, that split their traffic between alternative paths do not interleave, i.e., the ring can be separated into two pieces by removing two links such that each of the pieces obtained contains exactly one of these OD pairs (see FIG. 6B). We consider another feasible solution obtained from the fractional optimal solution in the following way: we increase the traffic of OD pair 1 in the counterclockwise direction by a small amount d while decreasing the traffic in the clockwise direction by the same amount. Similarly, we decrease the traffic of OD pair 2 in the counterclockwise direction by d, while increasing the traffic in the clockwise direction by d. (This can be done since the traffic of both OD pairs is nonzero in each direction in the routing specified by the fractional optimal solution.) The link flows corresponding to this feasible solution are the same as those corresponding to the fractional optimal solution on all the links, except on those along the clockwise path from origin 1 to origin 2 and from destination 2 to destination 1, and the counterclockwise path from origin 2 to origin 1 and destination 1 to destination 2, on which the flows are reduced. Since cost is an additive, monotonically increasing function of link flows, the feasible solution thus obtained has smaller cost value, contradicting the optimality of the starting fractional solution. Hence, in any optimal fractional solution of the relaxed version of problem, all OD pairs that divide their traffic must be interleaving. QED.

Next, we consider solving the integer-relaxed version of problem by means of some polynomial complexity LP method. The resulting optimal solution of the relaxed problem may involve some of the variables being fractional. In the next proposition, we show that there exists an algorithm which, starting from a fractional optimal solution, produces an integer optimal solution.

Proposition 3: Consider a ring network with multiple OD pairs such that the origins and the destinations can be separated. If the relaxed version of problem is feasible, then it has an integer optimal solution, which is also optimal for the integer-constrained problem.

Proof: We prove this proposition by providing an algorithm that takes an optimal fractional solution of the problem that involves some OD pairs that divide their traffic between alternative paths and at each iteration produces another optimal solution with fewer OD pairs that divide their traffic.

For this purpose, we first introduce some notation. Suppose in the beginning of an iteration, we have a fractional optimal solution of the relaxed version of problem that involves n OD pairs, denoted 1, . . . , n that split their input traffic between two alternative paths, in addition to some other OD pairs that send all their traffic along a single path. For the $i^{th}$ OD pair that splits its traffic, denote the flow along the counterclockwise path by $x_i$, where $0 < x_i < 1$. We consider the general case where no two of the given OD pairs have the same origin and the same destination. Otherwise, we can represent the common origin (or the common destination) by two origins (or two destinations) with a zero cost link in between. Without loss of generality, assume that the origins of the OD pairs are arranged consecutively in the clockwise direction. Since by Proposition 2, all OD pairs that divide their traffic between alternative paths must interleave, it can be seen that the corresponding destinations must also be arranged consecutively from 1 to n in the clockwise direction, as shown in FIG. 7, which also illustrates the link flows corresponding to a fractional optimal solution that involves three OD pairs that divide their traffic.

Figure 7:
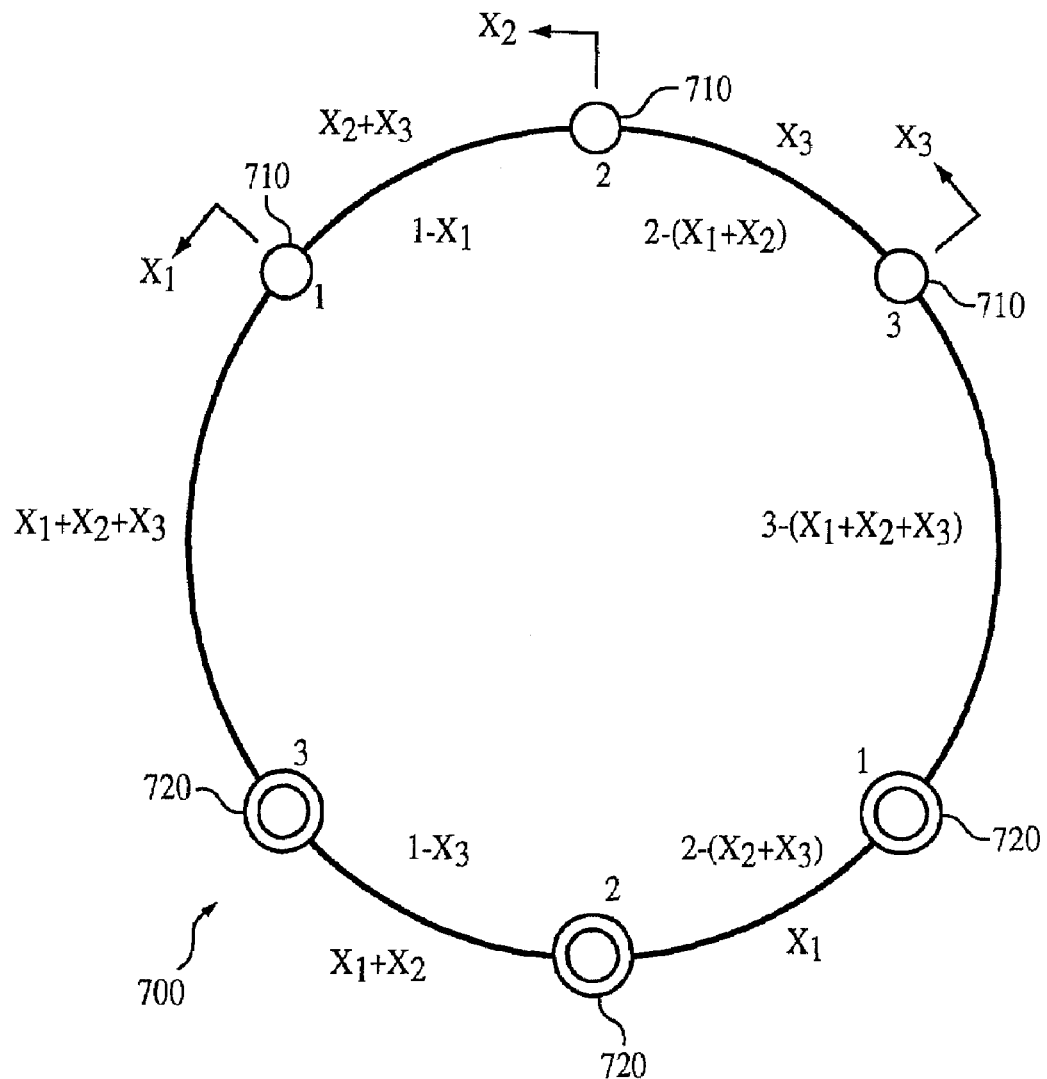

Referring to FIG. 7, a ring network 700 has three OD pairs, which interleave. Each OD pair has an origin node 710 and a destination node 720 that are similarly labeled (1-3). We consider a fractional optimal routing to the relaxed problem, in which the three OD pairs divide their traffic between the alternative paths. For this example, the flow along the counterclockwise path of the $i^{th}$ OD pair is given by $x_i$ with $0 < x_i < 1$. The corresponding link flows are also illustrated in the figure. The counterclockwise (clockwise) flows are shown outside (inside) the ring.

The flows of the links that belong to paths used by any of the n OD pair 1, . . . , n are equal to an integer plus or minus the following 2n quantities: $x_1$, $(x_1+x_2)$, . . . , $(x_1+x_2+ \ldots +x_{n-1})$, $(x_1+x_2+ \ldots +x_{n-1}+x_n)$, $(x_2+x_3+ \ldots +x_{n-1}+x_n)$, $(x_3+ \ldots x_{n-1}+x_n)$, . . . , $x_n$, 0.

Let us represent the 2n−1 nonzero of these quantities compactly as $a_j^T x$, $j=1, \ldots, 2n-1$, where x is the n-dimensional vector given by $x=(x_1, \ldots, x_n)$ and $a_j$, $j=1, \ldots, 2n-1$, is an n-dimensional vector whose components are 0 or 1. Let the index set $J(x)$ be given by $J(x)=\{j \in \{1, \ldots, 2n-1\} | a_j^T x = \text{integer}\}$.

One iteration of the algorithm consists of the following steps:

Step 1) Find a nonzero vector $\Delta x$ that satisfies a set of equations $a_j^T \Delta x = 0$, for all $j \in J(x)$.

To see shy such a nonzero vector exists note that, since $x_1, \ldots, x_n$ are noninteger, two successive quantities in the collection cannot be integer. Hence, this collection contains at most (n−1) nonzero quantities that are integer. This implies that the set $J(x)$ contains at most (n−1) indices, and therefore, the system of equations given above has a nonzero solution $\Delta x$. Since $\Delta x$ satisfies the system of equations, it follows that $J(x+\alpha \Delta x)=J(x)$ for some sufficiently small scalar $\alpha$, and the corresponding cost change, denoted by $\Delta$cost, can be expressed as $\Delta \text{cost} = \Delta \Sigma_j \notin J(x) \, b_j^k (a_j^T \Delta x) \geq 0$, where $b_j^k$ is the slope of linear segment k in the piecewise linear cost function for link j. The inequality follows from the assumption that the fractional optimal solution corresponding to x is optimal. Since −$\Delta x$ also satisfies the system of equations, the corresponding cost change is given by −$\Delta x$ also satisfies the system of equations, the corresponding cost change is given by −$\Delta$cost, and the preceding inequality holds with $\Delta x$ replaced by −$\Delta x$, implying that the cost change by moving along direction $\Delta x$ is zero. Hence, any $\Delta x$ satisfying the system of equations is a cost preserving direction at the optimal solution x, along which we can change x without increasing the cost.

Step 2) Let $\alpha$ be the smallest scalar such that, either any one of the components of the vector $x+\alpha \Delta x$ becomes integer or one of the link flows $a_j^T(x+\alpha \Delta x)$ for some $j \notin J(x)$ becomes integer. Replace x by $x+\alpha \Delta x$ and $J(x)$ by $J(x+\alpha \Delta x)$. If all components of the resulting vector x are integer, stop. Else, if at least one of the components of the vector x is integer, go to the next iteration. This corresponds to having a new optimal solution for the relaxed version of problem, which has fewer fractional components.

Step 3) Else go back to step 1. This corresponds to having a new optimal solution, which yields fewer fractional link flows.

Since there is a finite number of link flows that are noninteger, step 3 is repeated finite number of times before we get an optimal solution which involves fewer OD pairs that divide their traffic between alternative paths and go to the next iteration. Since at the end of each iteration, we have an optimal solution with fewer fractional components, this algorithm yields an integer optimal solution for this network in finite number of iterations. Note also that in the above procedure, since we keep the integer link flows constant and modify the fractional link flows, no additional wavelength channels are required to support the modified link flows. The essence of the algorithm lies in the fact that because of the special topology of this network, there exist nonzero directions, along which we can change a fractional optimal solution of the relaxed version of problem and obtain another optimal solution that has fewer fractional components. QED.

However, for a general ring network with arbitrarily located OD pairs, it is not necessarily true that if the integer-relaxed version of problem is feasible, then the problem has an integer optimal solution, as shown in the following example.

Example 1

Figure 8:
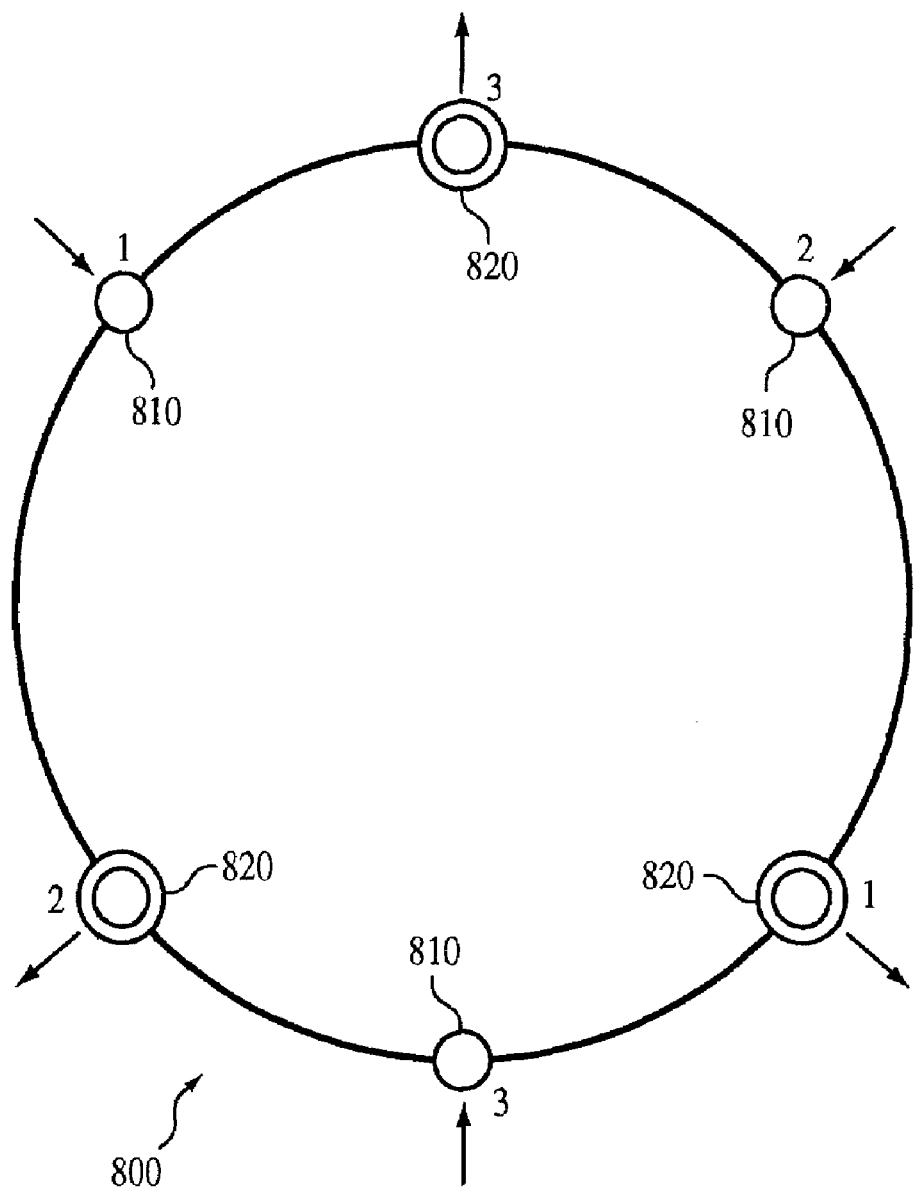
FIG. 8 is a diagram of a ring network example in which an optimal and integer solution is not feasible.

Consider the ring network of FIG. 8 in which a ring network 800 with the indicated OD pairs of origin nodes 810 and destination nodes 820 has a feasible solution for the relaxed version of problem, but does not have an integer optimal solution. In this example, we have three OD pairs and one wavelength channel available in each direction of the links. Each OD pair has one unit of input traffic. We claim that for this network, the integer problem is infeasible. That is, it is not possible to send the input traffic of each OD pair along a single path. To see this, assume without loss of generality that origin 1 sends one unit of traffic along the clockwise path. Since one of the links along the clockwise path of OD pair 2 does not have any available wavelength channels, origin 2 sends its traffic along the counterclockwise path, and it is not possible to send the input traffic of OD pair 3 along any of its two paths. On the other hand, if each origin divides its input traffic equally between the alternative paths, the flow of each link becomes either 1 or ½, showing that the integer-relaxed version of problem is feasible.

8.3 Ring Network with No Wavelength Conversion

Next we consider the case where G is a ring and there is no wavelength conversion capability at any of the nodes. We have the following result for ring networks with no wavelength conversion capability at any of the nodes.

Proposition 4: Consider a ring network with multiple OD pairs such that the origins and the destinations can be separated. If the relaxed version of problem with full wavelength conversion capability is feasible, then the relaxed version of problem has an integer optimal solution.

Proof: By Proposition 3, it follows that the relaxed version of problem has an integer optimal solution. This solution specifies a routing, in which all origins send their input traffic completely along a single path. For this topology, the paths in the clockwise and counterclockwise directions can be ordered, and the wavelength allocation algorithm for the line network (cf. Proof of Proposition 1) can be used to find a wavelength assignment with no wavelength conversion. The resulting routing-wavelength assignment gives an integer optimal solution of the relaxed version of problem. QED.

9 Obtaining Integer Solutions for Arbitrary Topologies

For general topologies, there may be some very rare cases where the integer-relaxed problems do not have integer optimal solutions. For this case, we provide an efficient rounding heuristic, that is based on the exact algorithm that yields integer optimal solutions for special topologies, and yields integer solutions for the general case with little or no loss of optimality.

As discussed above, computational experience suggests that for most network topologies, solving the relaxed versions of any of these formulations using the efficient Simplex method yields integer optimal solutions. However, there may be some network topologies for which the relaxed problems do not have integer optimal solutions (cf. Example 1). In this section, we provide an algorithm that uses the algorithm given in the proof of Proposition 3 of the previous section and yields an integer optimal solution (or near-suboptimal integer solution, for example, if there is no optimal integer solution) for the full wavelength conversion case for arbitrary network topologies. This algorithm may also be used to construct effective methods that compute optimal or near-optimal solutions for the no wavelength conversion case, as we discuss further below.

Suppose we have an arbitrary network with a given set of OD pairs and a given number of wavelength channels on the links. We assume that we have full wavelength conversion capability at all of the nodes of the network. We use the following algorithm to find an optimal or near-optimal solution of integer problem. We assume without loss of generality that each OD pair has one unit of input traffic. (An OD pair which has several units of input traffic can be represented in terms of several OD pairs which have the same origin and the same destination, and which has one unit of input traffic each.) We also assume there are some "extra" wavelength channels on the links that are unassigned and can be used in the algorithm. This entails no loss of generality, since these wavelengths can be introduced with an associated incremental cost (slope of piecewise linear link cost function) that is so high that these wavelengths are not used in an optimal solution of integer problem. Recall that a feasible solution of the integer problem in the second formulation has the form $x = \{x_p | p \in P_w, w \in W\}$, where W denotes the set of all OD pairs, and $P_w$ denotes the set of paths that some OD pair $w \in W$ may use.

At the start of iteration k, we have the subset $S_k$ of path flow variables (the $x_p$), which are subject to optimization, and the complementary set of the variables not in $S_k$, which have been permanently fixed at 0 or 1. Initially $S_0$ is the set of all path flow variables. The $k^{th}$ iteration of the algorithm consists of the following steps:

Step 1) Solve the relaxed version of the problem for the path flow variables in $S_k$, while the remaining path flow variables are fixed at 0 or 1. Let $x = \{x_p | p \in P_w, w \in W\}$ denote the corresponding optimal solution. If all the $x_p$ are integer, stop. Else go to step 2.

Step 2) At this step, we use an iterative procedure based on the algorithm given in the proof of Proposition 3 to round the fractional components of the vector x without changing its cost. In particular, we search for cost preserving directions, along which we can change x and obtain other optimal solutions that involve fewer fractional components (cf. proof of Proposition 3). This procedure consists of the following steps:

Step 2a) Let W' be the set of OD pairs that have some fractional path flow variables in the current solution x, and for each $w \in W'$, denote the set of paths that carry nonzero flows by $P'_w$, i.e., $x_p \in (0,1)$ for all $p \in P'_w$ and all $w \in W'$. Let $x' = \{x_p | p \in P'_w, w \in W'\}$ be a vector with m components, consisting of the fractional components of the current solution x. Denote L' to be the set of network links that belong to paths $p \in P'_w$ for all $w \in W'$. The flows of the links $j \in L'$ can be represented by an integer plus or minus the following quantities, $a_j^T x'$, $j \in L'$, where $a_j$, $j \in L'$, is an m-dimensional vector whose components are 0 or 1. Let the index set J(x') be given by $J(x') = \{j \in L' | a_j^T x' = \text{integer}\}$. If J(x') is empty, then let d be any m-dimensional vector and go to step 2c. Else go to step 2b.

Step 2b) Search for a nonzero vector d that satisfies the set of equations $a_j^T d = 0$, $\forall j \in J(x')$. If there exists such a nonzero vector, go to step 2c. Else go to step 3. (A cost preserving direction cannot be found.)

Step 2c) Let a be the smallest scalar such that, either any one of the components of the vector $x' + \alpha d$ becomes integer or one of the link flows $a_j^T(x' + \alpha d)$ for some $j \notin J(x')$ becomes integer. Replace x' by $x' + \alpha d$ and J(x') by $J(x' + \alpha d)$. Change the current solution x by replacing the corresponding components with those of x'. If all components of the vector x' are integer, stop. Else if at least one of the components of the vector x' is integer, go back to step 2a. This corresponds to having a new optimal solution for the relaxed version of the problem solved in step 1, which involves fewer fractional components. Else go to step 2d.

Step 2d) Go back to step 2b. This corresponds to having a new optimal solution, which yields fewer fractional link flows. Since there is a finite number of fractional link flows, this step will be repeated finitely many times before the number of fractional components of the current solution is reduced.

Step 3) Consider the set W' of OD pairs that have some fractional path flow variables in the current solution x. Find some $w' \in W'$ such that when setting $x_{p'}$ to 1, for some $p' \in P_{w'}$, and the $x_p$ to 0, for all $p \in P_{w'}$ with $p \neq p'$, the change in the cost is the most favorable. Change the current solution x by replacing $x_{p'}$ by 1 and $x_p$ by 0 for all $p \in P_{w'}$ with $p \neq p'$. Let $S_{k+1}$ be the set of noninteger components of the vector x and go to the next iteration.

At the termination of this algorithm, the resulting solution x specifies a routing, in which a single path is assigned to the input traffic of each OD pair. In essence, the algorithm solves the relaxed version of the problem (step 1) and searches for a cost preserving direction to round the fractional components of the resulting optimal solution (step 2). Whenever a cost preserving direction cannot be found, the algorithm chooses one OD pair that has some fractional path flow variables and rounds all of its variables to 0 or 1 (step 3). Then it resolves the relaxed problem with all the current integer variables fixed with the aim of rectifying poor routing patterns that have been created by rounding. Note that the number of wavelengths needed on the links may increase in step 3. This is the reason why we had to assume that we have extra wavelengths on the links. The algorithm may be viewed as a generalization of the one given for a ring network in which the origins and the destinations can be separated. In fact, for such a network, the algorithm terminates either at step 1 or step 2 with an integer optimal solution of the problem.

An alternative version of this algorithm combines steps 3 and 1. This alternative is more powerful but also requires more computation. In this alternative, upon entering step 3, for each $w' \in W'$ and each $p' \in P_{w'}$, set $x_{p'}=1$ and $x_p=0$ for all $p \in P_{w'}$ with $p \ne P'$, and we solve the corresponding relaxed version of the problem for the remaining path flow variables in $S_k$. We find the OD pair $w'$ and path $p'$ that results in the most favorable cost change, and proceed from here as in Step 3. This version of the algorithm may be viewed as a special case of a rollout algorithm, which is a general method for enhancing the effectiveness of heuristics.

Example 2

Consider the network of Example 1, where we have a ring network with three OD pairs having one unit of input traffic each (cf. FIG. 8). We assume that there is one wavelength channel with small incremental cost and additional wavelength channels with very high incremental cost in each direction of each link. For the $i^{th}$ OD pair, denote the flow along the counterclockwise path by $x_i$.

Let $S_0=\{x_1, x_2, x_3\}$ and solve the relaxed version of the problem for the path flow variables in $S_0$ for this network (step 1 of the algorithm). In terms of the variables in $S_0$, the flows on the links of this network are equal to $x_1, x_2, x_3, 1-x_1, 1-x_2, 1-3, x_1+x_2, x_1+x_3, x_2+x_3,$
$2-(x_1+x_2), 2-(x_1+x_3), 2-(x_2+x_3).$ Since there is only one wavelength channel with small incremental cost on the links and the vector $x=[\frac{1}{2}, \frac{1}{2}, \frac{1}{2}]$ is the only solution for which all the link flows are less than or equal to one, it follows that x is an optimal solution of the relaxed problem. Next we search for a nonzero direction along which we can change x without changing the cost (step 2). The link flows in the second line of the above collection are integer at the current solution x. Therefore, we search for a nonzero vector $d=[d_1, d_2, d_3]$ that satisfies $d_1+d_2=0$, $d_1+d_3=0$, $d_2+d_3=0$, (step 2b). Since there is no nonzero vector d that satisfies these equations, we search for some OD pair i, where i=1, 2, or 3, such that rounding $x_i$ to 0 or 1 gives the most favorable cost change (step 3). Due to symmetry of the location of OD pairs and the symmetry of the link flows at the current solution, it can be seen that setting any one of the $x_i$'s to 0 or 1 yields the same amount of cost change. Therefore, we choose to set $x_1$ to 1 and update x to $x=[1, \frac{1}{2}, \frac{1}{2}]$. Let $S_1=\{x_2, x_3\}$ (the noninteger components of the resulting vector x) and resolve the relaxed problem for the path flow variables in $S_1$, while $x_1$ is fixed at 1. In terms of the variables in $S_1$, the flows of the links that belong to paths used by OD pairs 2 and 3 are equal to an integer plus or minus the following quantities: $x_2$, $x_3$, $x_2+x_3$. It can be seen that $x=[1, \frac{1}{2}, \frac{1}{2}]$ is an optimal solution of this relaxed problem. (This can be verified analytically or computationally using a simple LP code.) Since at the current solution x, the only quantity that is integer in the above collection is $x_2+x_3$, we let $d=[d_2, d_3]$ be any vector that satisfies $d_2+d_3=0$. In particular, we choose $d=[1, -1]$ and change $[x_2, x_3]=[\frac{1}{2}, \frac{1}{2}]$ to $[x_2, x_3]+\frac{1}{2}[d_2, d_3]=[1, 0]$. We update x to $x=[1, 1, 0]$ by replacing the corresponding components. (This is another optimal solution of the relaxed problem, which is solved for the variables in $S_1$ with $x_1$ fixed at 1.) Since all components of x are integer, we stop. The resulting integer solution is also an integer optimal solution of the problem.

Example 3

Figure 9:
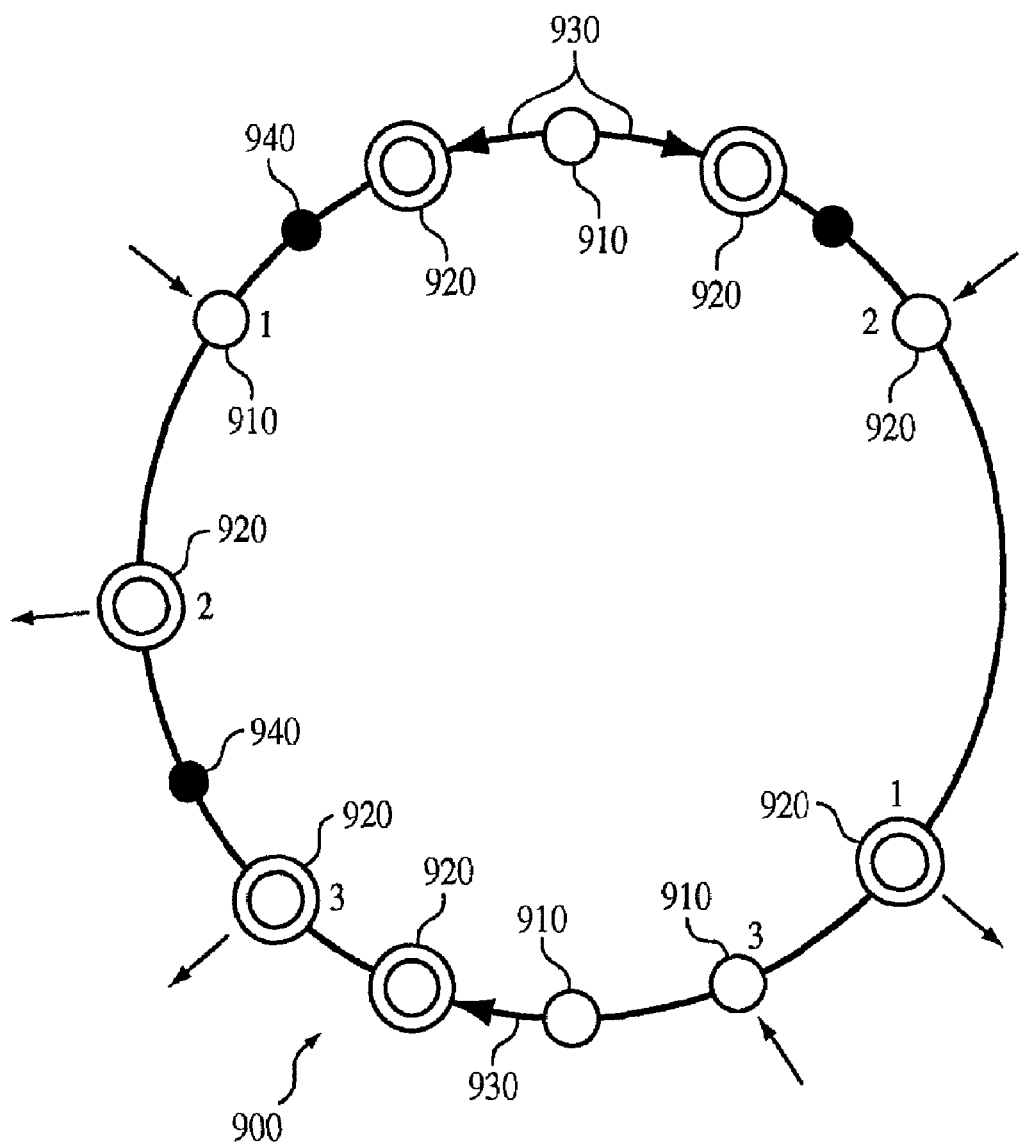
FIG. 9 is a diagram of an example of a ring network.
Figure 10:
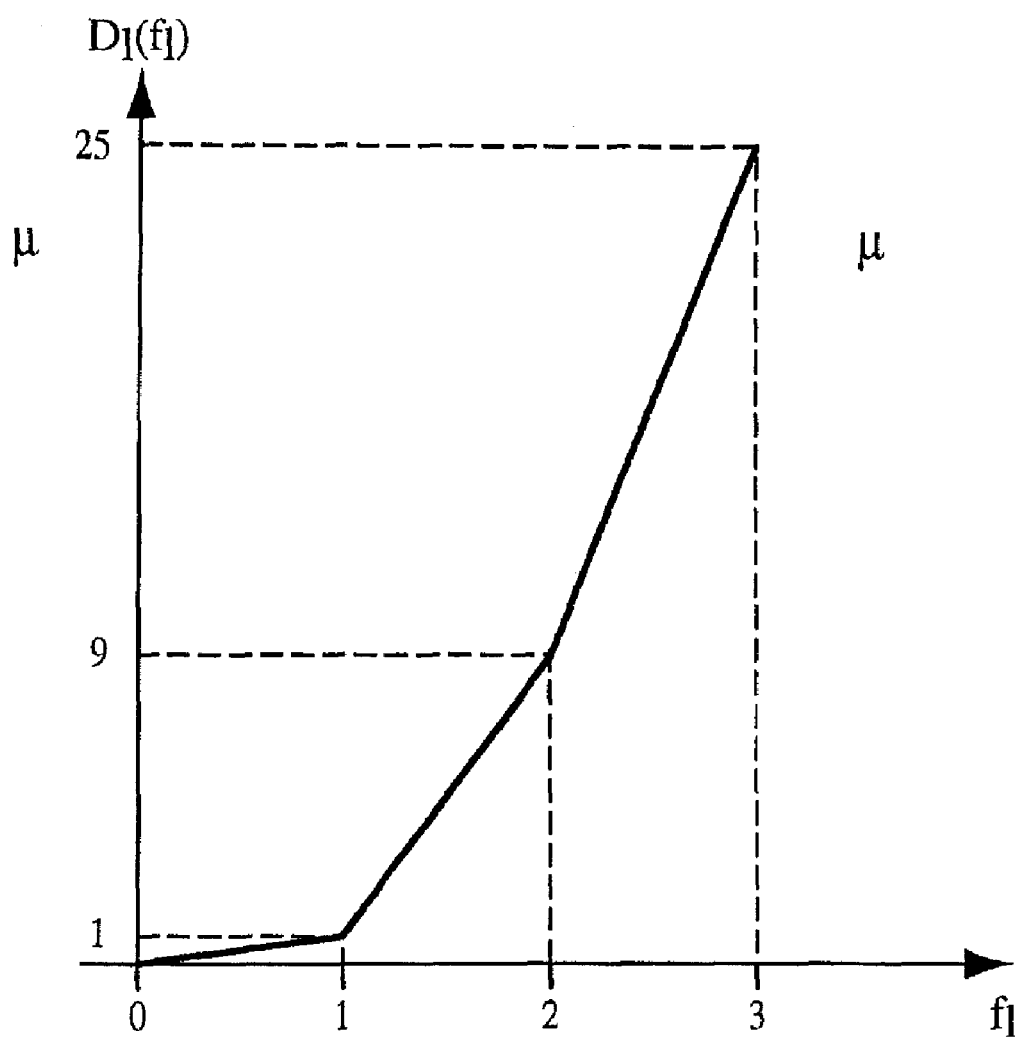
FIG. 10 is a cost function for the example shown in FIG. 9.

Consider the ring network of FIG. 9 in which a ring network 900 with three OD pairs that each send their one unit of input traffic from the origin node 910 to the destination node 920 along a single path 930. Three OD pairs (labeled 1, 2, and 3) with one unit of input traffic each are associated with fractional solutions and whose routing is subject to optimization in this stage. A number of nodes 940 do not transmit or receive any traffic. Each link cost function has the piecewise linear form shown in FIG. 10 for each link of the network. For the $i^{th}$ OD pair, we denote the flow along the counterclockwise path by $x_i$.

Let $S_0=\{x_1, x_2, x_3\}$ and solve the relaxed version of problem (F1) for the path flow variables in $S_0$ for this network. In terms of the variables in $S_0$, the flows on the links of this network are equal to an integer plus or minus the following quantities:

$x_1, x_2, x_3, x_1+x_2, x_1+x_3, x_2+x_3, x_1+x_2+x_3.$

The vector $x=[\frac{1}{2}, \frac{1}{2}, \frac{1}{2}]$ is an optimal solution of this problem with optimal cost equal to 45. (This can be verified analytically or computationally using a simple LP code.) The quantities in the second line of the above collection are integer at the current solution x. Therefore, we search for a nonzero vector $d=[d_1, d_2, d_3]$ that satisfies $d_1+d_2=0, d_1+d_3=0, d_2+d_3=0.$ Since there is no nonzero vector d that satisfies these equations, we search for some OD pair i, where i=1, 2 or 3, such that rounding $x_i$ to 0 or 1 gives the most favorable cost change. There are six different ways of rounding one of the $x_i$'s to 0 or 1. The resulting vectors and the costs are given as follows:

[0, ½, ½] with cost 48.5,
[1, ½, ½] with cost 55.5,
[½, 0, ½] with cost 54,
[½, 1, ½] with cost 79,
[½, ½, 0] with cost 50.5,
[½, ½, 1] with cost 75.5.

Rounding $x_1$ to 0 gives the least amount of cost change, so we set $x_1$ equal to 0, and update x to $x=[0, \frac{1}{2}, \frac{1}{2}]$, which has a cost of 48.5. Let $S_1=\{x_2, x_3\}$ and resolve the relaxed problem for the path flow variables in $S_1$, while $x_1$ is fixed at 0. It can be verified computationally that the vector $x=[0, 1, 0]$ is an optimal solution of this problem with optimal cost 45, which is also the integer optimal solution of the problem for this network. Note that in this example, resolving the relaxed problem after rounding one of the variables reduces the cost of the current solution, thus rectifying the poor routing resulting from rounding. If we did not resolve the relaxed problem and instead tried to find a direction using step 2 of the algorithm, we could have obtained the vector $x=[0, 0, 1]$, which is an integer solution of the problem with cost 51. The reason is that when the current solution is not an optimal solution of the relaxed problem, step 2 need not yield a cost preserving direction and we may end up with an integer solution which is far from optimal.

Example 4

Figure 11:
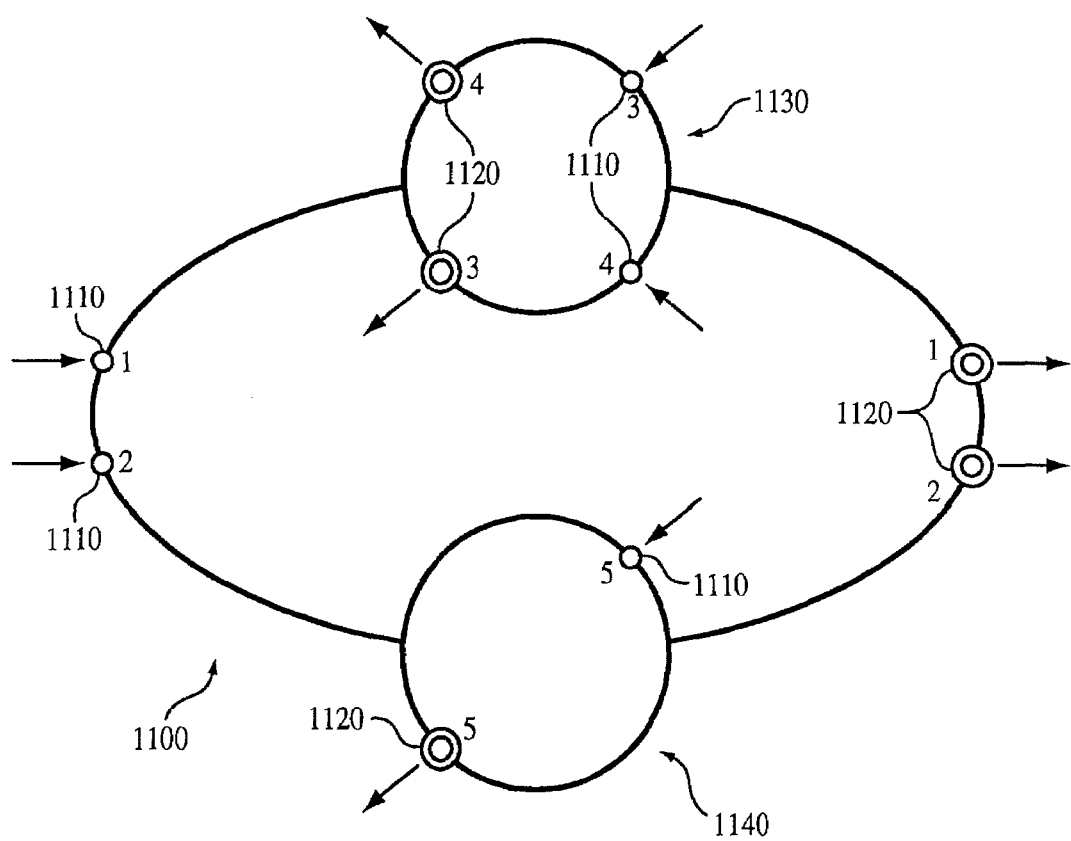
FIG. 11 is a diagram of an example of a ring network with two subrings in the network.

Consider the network of FIG. 11, which is a ring that includes two subrings 1130 and 1140. Each OD pair has one unit of input traffic. We assume that there is one wavelength channel with small incremental cost and additional wavelength channels with very high incremental cost in each direction of each link. By an argument similar to the proof of Proposition 2, it can be shown that in any optimal routing, OD pair 1 sends its input traffic along the paths in the clockwise direction of the outer ring, and OD pair 2 sends its input traffic along the paths in the counterclockwise direction of the outer ring. Hence, there are two paths that may be used by OD pair 1; the path that traverses subring 1130 in the clockwise direction and the path that traverses subring 1130 in the counter-clockwise direction. The same claim is true for OD pair 2 with subring 1130 replaced by subring 1140. Denote the flow along the path of OD pair 1 that goes counterclockwise around subring 1130 by $x_1$ and the flow along the path of OD pair 2 that goes counterclockwise around subring 1140 by $x_2$. Assume that the OD pairs whose origins and destinations are located on one of the subrings use the two paths that consist exclusively of the links of that subring. Denote the flows of the counterclockwise paths of OD pairs 3 and 4 around subring 1130 by $x_3$ and $x_4$ respectively, and the flow of the counterclockwise path of OD pair 5 around subring 1140 by $x_5$.

Let $S_0 = \{x_1, x_2, x_3, x_4, x_5\}$ and solve the relaxed version of the problem for the path flow variables in $S_0$. In terms of the variables in $S_0$, the flows on the links of this network are equal to an integer plus or minus the following quantities:

$$x_1, x_2, x_3, x_4, x_5, x_1+x_3, x_1+x_4, x_3+x_4, x_2+x_5.$$

It can be verified analytically or computationally that $$x=[x_1, \ldots, x_5]=[\tfrac{1}{2}, \tfrac{1}{2}, \tfrac{1}{2}, \tfrac{1}{2}, \tfrac{1}{2}]$$

is an optimal solution of the relaxed problem. Since the quantities in the second line of the above collection are integer at the optimal solution x, we search for a nonzero vector $d=[d_1, \ldots, d_5]$ that satisfies $d_1+d_3=0$, $d_1+d_4=0$, $d_3+d_4=0$, $d_2+d_5=0$. It follows that $d=[0, 1, 0, 0, -1]$ satisfies these equations and therefore is a cost preserving direction. We change x to $x+\tfrac{1}{2}d=[\tfrac{1}{2}, 1, \tfrac{1}{2}, \tfrac{1}{2}, 0]$, which is another optimal solution of the relaxed problem, in which OD pairs 2 and 5 send their input traffic completely along a single path. In this new optimal solution, only $x_1$, $x_3$, and $x_4$ are noninteger, and the flows of the links that belong to paths used by OD pairs 1, 3, and 4 are equal to an integer plus or minus the following quantities:

$$x_1, x_3, x_4, x_1+x_3, x_1+x_4, x_3+x_4.$$

All the quantities in the second line above are integer at the new optimal solution x. However, there exists no nonzero vector $d=[d_1, d_3, d_4]$ which satisfies $d_1+d_3=0$, $d_1+d_4=0$, $d_3+d_4=0$. Therefore, we search for some OD pair i, where i=1, 3 or 4, such that rounding $x_i$ to 0 or 1 gives the most favorable cost change. Due to symmetry of the location of OD pairs around subring 1130 and the symmetry of the link flows at the current solution, it can be seen that setting any one of the $x_i$'s to 0 or 1 yields the same amount of cost change. Therefore, we choose to set $x_1$ to 1 and update x to $x=[1, 1, \tfrac{1}{2}, \tfrac{1}{2}, 0]$. Let $S_1=\{x_3, x_4\}$ and resolve the relaxed problem for the path flow variables in $S_1$, while the remaining variables are fixed at 0 or 1. It can be verified that $x=[1, 1, 1, 0, 0]$ is an optimal solution of this problem, which also turns out to be the optimal solution of the problem for this network 1100.

9.1 The No Wavelength Conversion Case

For any network topology, the integer optimal (or slightly suboptimal) solution of the problem obtained at the end of the above algorithm specifies a routing for the OD pairs in which all OD pairs send their input traffic completely along a single path. We call such a routing an integer routing. In some cases, for this routing, a wavelength assignment can be obtained that involves no wavelength conversion at the intermediate nodes. The resulting routing-wavelength assignment specifies an integer optimal (or near-optimal) solution for the no wavelength conversion problem. One such situation was shown in Proposition 4 for ring networks, in which the origins and the destinations can be separated. The idea there was that the integer optimal solution of problem specifies a routing, in which the paths can be ordered in both clockwise and counterclockwise directions. The problem thus reduces to two independent line networks and the wavelength allocation algorithm for the line network, given in the proof of Proposition 1, can be used to find the optimal wavelength assignment with no wavelength conversion. Using the same reasoning, it can be shown that in an arbitrary ring network, given an integer routing, if the corresponding paths "do not wrap around each other" in both directions, a wavelength assignment with no wavelength conversion can be found. For the general case when the paths wrap around in a ring network, we have the following result. We say that a wavelength assignment is valid if along each path, for any successive links that were assigned different wavelengths, there is a wavelength converter at the intermediate node joining these links.

Proposition 5: Suppose that we are given a ring network with multiple OD pairs and an integer routing. Assume that one of the nodes the ring network is equipped with a wavelength converter that has full wavelength conversion capability. Then a valid wavelength assignment can be found for this routing.

Proof: Suppose that the ring is cut at the node with the wavelength converter to form a line network. Paths in the given routing that cross this node (i.e., that wrap around the ring) are broken into two paths. Then the wavelength allocation algorithm for the line network can be used to find a wavelength assignment for these paths. Paths which were broken into two may be assigned two different wavelengths, but these wavelengths are converted using the wavelength converter at this node, showing that the resulting wavelength assignment is valid. QED.

10 Alternative Optimization Approaches

In the discussion above, the approach to the optimization problem is to form a continuous convex optimization problem with a linear objective function that is then solved using an implementation of the Simplex algorithm. In alternative versions of the approach, different algorithms for solving the optimization problem are used. For example, a gradient search can be used. Such a gradient search is applicable to the case of nonsmooth (nondifferentiable) optimization functions. Also, for some of these different algorithms, the relaxed problem, which has linear constraints but not a linear objective function, can be solved directly without first forming the associated relaxed problem. Also, the optimization algorithm can be implemented in a distributed manner.

11 Related Applications

The approach described above is in the context of routing all-optical lightpaths in an optical network. The approach is applicable to other related routing problems. For example, a network in which each link each carry a set of multiplexed channels can be addressed using such an approach, such as channel allocation problems in wireless networks. The channels can be multiplex in different ways, for example, using time division or frequency division multiplexing. Use of the continuous-convex optimization approach is also applicable to routing in a circuit switched network, or in a virtual circuit switched network. Constraints on the switching at intermediate nodes of a route can be represented in the optimization problem. Another alternative application involves assignment of paths to different time slots in a time division multiplexing approach, for example in a SONET network, rather than to different wavelengths in a wavelength division multiplexing approach. In such an example, rather than introducing constraints on wavelength conversion, the constraints are related to routing a path from one timeslot to a different time slots on various links of the path. In yet another example of the approach, a combination of time division multiplexing and wave division multiplexing can be addressed. For example, sessions can be assigned to different time slots in a SONET network at the edge of the network, and optical SONET signals can be routed along all-optical paths at the interior of the network.

The optimization approach described above is also applicable to a broad range of integer programming problems that may arise in other contexts, such as in circuit design. The optimization approach is also applicable to multicomodity flow problems with integer constraints, thereby providing a polynomial-time algorithm.

It is to be understood that the foregoing description is intended to illustrate and not to limit the scope of the invention, which is defined by the scope of the appended claims. Other embodiments are within the scope of the following claims.

What is claimed is:

1. A method for assigning communication sessions in a communication network in which a network controller is configured to communicate with nodes that are coupled by communication links and at least some of the communication links support communication on discrete multiplexed channels, the method comprising:
    at the network controller, accepting a specification of a communication capacity for each of a plurality of communication sessions between nodes of the network to be assigned to paths formed by links and multiplexed channels on said links through the network according to a cost function that depends on said assignment; and
    computing a routing configuration by the network controller, including
    formulating a continuous optimization problem in terms of a set of optimization variables and an objective function that depends on the optimization variables, wherein the optimization variables are subject to a set of constraints that define a continuous convex multidimensional region and wherein each assignment of the communication session to paths formed by links and multiplexed channels through the network corresponds to a different point in the continuous region,
    solving the continuous optimization problem, including determining optimal values for each of the optimization variables that optimize the objective function, and
    determining the assignment of the communication sessions to paths formed by links and multiplexed channels through the network such that it corresponds to the optimal values obtained in solving the continuous optimization problem, wherein said assignment optimizes the cost function.

2. The method of claim 1 wherein formulating the continuous optimization problem includes determining a set of linear constraints that define the convex region.

3. The method of claim 2 wherein formulating the continuous optimization problem includes formulating the objective function to include terms that each corresponds to a different link of the network, and each of said terms is a function of the assignment of communication sessions to the corresponding link.

4. The method of claim 3 wherein formulating the objective function includes formulating terms that correspond to links on which multiple communication channels are multiplexed, and said terms each includes' a convex function of a number of communication sessions assigned to said multiplexed communication channels.

5. The method of claim 4 wherein the function of the number of communication sessions has discontinuities in its first derivative at values of its argument corresponding to assignments of the communication sessions to paths in the network.

6. The method of claim 5 wherein the function is a piecewise linear function.

7. The method of claim 6 wherein the function has constant slope between values of its argument corresponding to feasible assignments of the communication sessions to paths in the network.

8. The method of claim 1 wherein formulating the continuous optimization problem further includes formulating the objective function as a linear function of the optimization variables.

9. The method of claim 8 wherein solving the continuous optimization problem includes applying a linear programming algorithm.

10. The method of claim 9 wherein applying the linear programming algorithm uses a simplex algorithm.

11. The method of claim 1 wherein formulating the continuous optimization problem includes formulating the set of constraints to include constraints related to the capabilities of the nodes to route communication between particular communication channels on links coupled to said nodes.

12. The method of claim 11 wherein the network includes nodes that couple optical links that carry wavelength multiplexed optical communication channels, and wherein formulating the set of constraints includes formulating constraints related to capabilities of said nodes to couple optical communication channels associated with particular wavelengths on different links coupled to said nodes.

13. The method of claim 12 wherein formulating the constraints related to capabilities of said nodes to couple optical communication channels includes formulating constraints related to wavelength continuity at the nodes, formulating constraints related to wavelength conversion capabilities at the node, or both.

14. The method of claim 1 wherein the optimization problem characterizes previously assigned communication sessions on the network, whereby the method is for dynamically routing communication sessions.

15. The method of claim 14 wherein formulating the optimization problem includes formulating constraints related to assigned routes of the previously assigned communication sessions.

16. The method of claim 14 wherein the network supports reassignment of the previously assigned communication sessions and the objective function includes a penalty term related to the previous assignments, and the formulated optimization problem is such that reassignment of the previously assigned sessions is feasible, but is penalized relative to a solutions that maintain the previous assignments.

17. An optical communication network comprising:
nodes coupled by optical communication links in which the links support communication on a set of wavelength multiplexed channels; and
a network controller coupled to the nodes and configured to compute a jointly optimization of an assignment of communication sessions to paths through the network and to wavelength multiplex channels on the links of said paths according to a cost function;
wherein computing the joint optimization comprises
formulating a continuous optimization problem in terms of a set of optimization variables and an objective function that depends on the optimization variables, wherein the optimization variables are subject to a set of constraints that define a continuous convex multidimensional region and wherein each assignments of the communication session to paths formed by links and multiplexed channels through the network correspond to a discrete points in the continuous region,
solving the continuous optimization problem, including determining optimal values of the optimization variables such that they optimize the objective function, and
determining the assignment of the communication sessions to paths formed by links and wavelength multiplexed channels through the network such that the assignment corresponds to the optimal values obtained in solving the continuous optimization problem, wherein said assignment optimizes the cost function.

18. The system of claim 17 wherein said set of constraints includes constraints related to a communication capacity for each of the plurality of communication sessions between nodes of the network, and wherein the objective function includes a sum of terms each associated with a different link of the network, wherein each term includes a convex function of the number of wavelength multiplexed channels assigned to a communication session on the associated link and the convex function has breakpoints at arguments corresponding to integer values of the number of channels assigned.

19. The system of claim 18 wherein the set of constraints further includes constraints related to capabilities of nodes to coupled channels at particular wavelength on different of the links coupled to said nodes.

20. A method for configuring an optical communication network with nodes coupled by optical communication links in which the links support communication on a set of wavelength multiplexed channels such that it supports a plurality of communication sessions between nodes of the network on paths formed by links and wavelength multiplexed channels on said links, comprising:
formulating by a network controller for the communication network a continuous optimization problem in terms of a set of optimization variables and an objective function that depends on the optimization variables, wherein the optimization variables are subject to a set of constraints that define a continuous convex multidimensional region and wherein each assignments of the communication session to paths formed by links and multiplexed channels through the network correspond to a discrete points in the continuous region;
solving by the network controller the continuous optimization problem, including determining optimal values for each of the optimization variables that optimize the objective function and determining the assignment of the communication sessions to paths formed by links and multiplexed channels through the network such that it corresponds to the optimal values obtained in solving the continuous optimization problem; and
determining by the network controller a configuration of network resources according to the determined assignment of communication sessions.

\* \* \* \* \*